United States Patent
Nishiumi

(10) Patent No.: US 11,060,007 B2
(45) Date of Patent: Jul. 13, 2021

(54) ORGANIC-INORGANIC COMPOSITE PARTICLES AND MANUFACTURING METHOD THEREFOR, AND THERMALLY CONDUCTIVE FILLER AND THERMALLY CONDUCTIVE RESIN COMPOSITION AND MANUFACTURING METHOD THEREFOR

(71) Applicant: SEKISUI KASEI CO., LTD., Osaka (JP)

(72) Inventor: Kengo Nishiumi, Shiga (JP)

(73) Assignee: SEKISUI KASEI CO., LTD., Osaka (JP)

( * ) Notice: Subject to any disclaimer, the term of this patent is extended or adjusted under 35 U.S.C. 154(b) by 176 days.

(21) Appl. No.: 16/491,335

(22) PCT Filed: Mar. 30, 2018

(86) PCT No.: PCT/JP2018/013848
§ 371 (c)(1),
(2) Date: Sep. 5, 2019

(87) PCT Pub. No.: WO2018/181984
PCT Pub. Date: Oct. 4, 2018

(65) Prior Publication Data
US 2020/0032122 A1    Jan. 30, 2020

(30) Foreign Application Priority Data

Mar. 31, 2017 (JP) .............................. JP2017-072451

(51) Int. Cl.
*C08K 9/04* (2006.01)
*C09K 5/14* (2006.01)
*C08K 3/22* (2006.01)

(52) U.S. Cl.
CPC ................ *C09K 5/14* (2013.01); *C08K 3/22* (2013.01); *C08K 9/04* (2013.01); *C08K 2003/2227* (2013.01)

(58) Field of Classification Search
CPC ... C09K 5/14; C08K 3/22; C08K 9/04; C08K 2003/2227; C08K 2003/282; C08K 2201/005; C08F 2/20; C08F 212/08; C08F 2/44; C08F 292/00; C08G 83/001
USPC ...................................................... 523/200
See application file for complete search history.

(56) References Cited

U.S. PATENT DOCUMENTS 5,852,108 A * 12/1998 Yamanaka ................ C08F 2/44
524/790
2017/0101538 A1    4/2017 Kubo et al.

FOREIGN PATENT DOCUMENTS

| JP | 2004-196859 | 7/2004 |
|---|---|---|
| JP | 2006-52332 | 2/2006 |
| JP | 2010-138302 | 6/2010 |
| JP | 2011-94119 | 5/2011 |
| JP | 2011-214000 | 10/2011 |
| JP | 2012-124449 | 6/2012 |
| JP | 2015-67702 | 4/2015 |
| KR | 10-2017-0009826 | 1/2017 |

OTHER PUBLICATIONS

International Search Report dated Jul. 3, 2018 in International Application No. PCT/JP2018/013848.
Notice of Reasons for Refusal dated Apr. 21, 2020 in corresponding Japanese Patent Application No. 2017-072451, with English translation.
Notice of Reasons for Refusal dated Jun. 25, 2020 in corresponding Korean Patent Application No. 10-2019-7019753, with English translation.

* cited by examiner

*Primary Examiner* — Hannah J Pak
(74) *Attorney, Agent, or Firm* — Wenderoth, Lind & Ponack, L.L.P.

(57) ABSTRACT

Organic-inorganic composite particles include: a vinyl polymer that is a polymer of a polymerizable vinyl monomer; and inorganic particles including inorganic oxide and/or inorganic nitride. The thermal conductivity of the inorganic particles is 10 W/(m·K) or more. The inorganic particles are subjected to a surface treatment by acidic phosphoric acid ester having no polymerizable functional group, and by at least one polymerizable compound selected from the group consisting of: carboxylic acid having a polymerizable functional group; acidic phosphoric acid ester having a polymerizable functional group; and lactone having a polymerizable functional group. The polymerizable compound is bonded to the vinyl polymer, and the inorganic particles are unevenly located on surface layers of the organic-inorganic composite particles so that the inorganic particles form one or more layers.

10 Claims, 16 Drawing Sheets

ORGANIC-INORGANIC COMPOSITE PARTICLES AND MANUFACTURING METHOD THEREFOR, AND THERMALLY CONDUCTIVE FILLER AND THERMALLY CONDUCTIVE RESIN COMPOSITION AND MANUFACTURING METHOD THEREFOR

TECHNICAL FIELD

The present invention relates to organic-inorganic composite particles and a manufacturing method therefor, and also relates to a thermally conductive filler and a thermally conductive resin composition and a manufacturing method therefor.

BACKGROUND ART

Resin particles having an average particle diameter of 0.01 to 100 μm are used, for example, for an additive (e.g., a flatting agent, and a designability providing agent for applying fine unevenness to a surface of a coating film) for a coating material, an additive (e.g., a flatting agent) for ink, a main component of or an additive for an adhesive, an additive (e.g., a shrinkage reducing agent) for cultured marble, a paper treating agent, a filler (filler for improving lubricity) for cosmetics, a column packing material for chromatography, a toner additive for developing an electrostatic image, an anti-blocking agent for a film, and a light diffusing agent for a light diffuser (e.g., a light diffusion film).

As a method for highly functionalizing particles, a method for compositing resin particles with an inorganic compound has been proposed. By this method, particles that have properties of both the resin particles and the inorganic compound can be obtained, which may lead to improvement of various properties such as stability, heat resistance, flame resistance, chemical resistance, thermal conductivity and electrical conductivity.

Examples of the organic-inorganic composite particles obtained by compositing the resin particles with the inorganic compound include composite particles described in Patent Documents 1 and 2.

Patent Document 1 describes composite particles obtained by covering magnetic resin particles with thermally conductive inorganic particles using the impinging method in a high-speed gas stream, the mechanofusion method, or the mechanochemical method.

Patent Document 2 describes a method for manufacturing composite particles that includes the steps of: preparing a liquid containing polymer particles, inorganic particles, and a water-soluble polymer; and insolubilizing the water-soluble polymer to make the inorganic particles adhere to the surfaces of the polymer particles.

PRIOR ART DOCUMENTS

Patent Documents

[Patent Document 1] JP 2012-124449 A
[Patent Document 2] JP 2006-052332 A

SUMMARY OF THE INVENTION

Problem to be Solved by the Invention

However, in the composite particles described in Patent Document 1, the inorganic compound is merely physically adsorbed on the surfaces of the magnetic resin particles. Accordingly, the inorganic compound may fall off the surfaces of the magnetic resin particles.

Also in the composite particles described in Patent Document 2, the inorganic particles are merely adhered to the surfaces of the polymer particles via the water-soluble polymer. Therefore, if the composite particles are exposed in the water, the adhesion to the surfaces of the resin particles decreases, and accordingly, the inorganic particles may fall off the surfaces of the resin particles. Furthermore, Patent Document 2 requires a third component (i.e. the water-soluble polymer) in order to adhere the inorganic particles to the surfaces of the polymer particles, and also requires an additional step of insolubilizing the water-soluble polymer, specifically, reacting the water-soluble polymer with the aldehyde compound (for example, heat treatment of the water-soluble polymer in the acid solution in the presence of the aldehyde compound), which leads to a complicated manufacturing method. If the water-soluble polymer is not insolubilized, the adhesion rate of the inorganic particles to the polymer particles decreases without the presence of the water-soluble polymer, as shown in Comparative Examples 1 to 6 of Patent Document 2.

Recently, according to high-density or thinning of electronic devices, an IC (integrated circuit) or a power component generates a critical amount of heat. Therefore, it is important to efficiently dissipate the heat from the electronic devices. For this purpose, various heat dissipation members are developed. Particularly, a sheet-like molding (heat dissipation sheet) having a heat dissipation function is now widely used as a heat dissipation member that can solve the above problem. The majority of the heat dissipation sheets contain a silicone resin or an epoxy resin as a main component because of its excellence in heat resistance, adhesiveness, flame resistance, and long-term reliability. Since the silicone resin and the epoxy resin themselves hardly have heat dissipation property (thermal conductivity), generally, a heat dissipation sheet is used, which is made by filling the silicone resin with a thermally conductive filler. As the thermally conductive filler, the inorganic particles are conventionally used.

If it is possible to realize a thermally conductive resin composition that contains organic-inorganic composite particles obtained by compositing polymer particles with an inorganic compound and that has a sufficient thermal conductivity, it is considered to be beneficial because the flexibility and lightweight property can be improved compared to a thermally conductive resin composition containing inorganic particles as a thermally conductive filler.

The present invention was made in consideration of the above conventional problem, an object of which is to provide organic-inorganic composite particles and a manufacturing method thereof. The organic-inorganic composite particles have the following features: an inorganic compound is not likely to fall off; a simple method is sufficient to manufacture the organic-inorganic composite particles; and when the organic-inorganic composite particles are added as a filler to a matrix resin such as a silicone resin and an epoxy resin, a sufficient thermal conductivity is given to the resin composition.

Means for Solving the Problem

In order to solve the above problem, organic-inorganic composite particles of the present invention include: a vinyl polymer that is a polymer of a polymerizable vinyl monomer; and inorganic particles including at least one of inorganic oxide and inorganic nitride. The thermal conductivity of the inorganic particles is 10 W/(m·K) or more.

The inorganic particles are subjected to a surface treatment by acidic phosphoric acid ester having no polymerizable functional group, and by at least one polymerizable compound selected from the group consisting of: carboxylic acid having a polymerizable functional group; acidic phosphoric acid ester having a polymerizable functional group; and lactone having a polymerizable functional group. The at least one polymerizable compound is bonded to the vinyl polymer. The inorganic particles are unevenly located on surface layers of the organic-inorganic composite particles so that the inorganic particles form one or more layers.

With the configuration of the present invention, the inorganic particles are subjected to the surface treatment by acidic phosphoric acid ester having no polymerizable functional group and by at least one polymerizable compound, which is bonded to the vinyl polymer, selected from the group consisting of: carboxylic acid having a polymerizable functional group; acidic phosphoric acid ester having a polymerizable functional group; and lactone having a polymerizable functional group. Thus, the inorganic compound is not likely to fall off the vinyl polymer. Also, the organic-inorganic composite particles of the present invention can be manufactured by simple steps because there is no need to add a step of insolublizing a third component so as to adhere the inorganic particles to the surfaces of the resin particles.

Also, with the configuration of the present invention, the inorganic particles having a thermal conductivity of 10 W/(m·K) or more are unevenly located on the surface layers of the organic-inorganic composite particles so that the inorganic particles form one or more layers. Thus, when the organic-inorganic composite particles are added as a filler to a matrix resin such as a silicone resin and an epoxy resin, the layers of the inorganic particles of the adjacent organic-inorganic composite particles come into contact with each other to form a thermal conduction path, which gives a sufficient thermal conductivity to the resin composition. Also, the thermally conductive resin composition can be made flexible and light in weight by adding the organic-inorganic composite particles as the thermally conductive filler to the matrix resin compared to the case in which the inorganic particles are added as the thermally conductive filler.

In order to solve the above problem, in a method for manufacturing organic-inorganic composite particles of the present invention, the organic-inorganic composite particles contain: a vinyl polymer that is a polymer of a polymerizable vinyl monomer; and inorganic particles that include at least one of inorganic oxide and inorganic nitride and that has a thermal conductivity of 10 W/(m·K) or more. The method includes the steps of: preparing hydrophobized inorganic particles by reacting, in a hydrophilic solvent: the inorganic particles; acidic phosphoric acid ester having no polymerizable functional group; and at least one porimerizable compound selected from the group consisting of carboxylic acid having a polymerizable functional group, acidic phosphoric acid ester having a polymerizable functional group, and lactone having a polymerizable functional group; preparing a polymerizable mixture by mixing the hydrophobized inorganic particles, the polymerizable vinyl monomer, and a polymerization initiator; and obtaining the organic-inorganic composite particles by suspension polymerization in which the polymerizable mixture is polymerized in an aqueous medium in the presence of a dispersant.

With the above method, it is possible to manufacture the organic-inorganic composite particles having the following features: the inorganic compound is not likely to fall off; a simple method is sufficient to manufacture the organic-inorganic composite particles; and when the organic-inorganic composite particles are added as a filler to a matrix resin such as a silicone resin and an epoxy resin, a sufficient thermal conductivity is given to the resin composition.

Effects of the Invention

With the present invention, it is possible to provide organic-inorganic composite particles and a manufacturing method thereof, the organic-inorganic composite particles having the following features: an inorganic compound is not likely to fall off; a simple method is sufficient to manufacture the organic-inorganic composite particles; and when the composite particles are added as a filler to a matrix resin such as a silicone resin and an epoxy resin, a sufficient thermal conductivity is given to the resin composition. Furthermore, by adding the organic-inorganic composite particles as a thermally conductive filler to the silicone resin or the epoxy resin, it is possible to improve the flexibility and the lightweight property of the resin composition compared to the case in which the inorganic particles are added as the thermally conductive filler.

MEANS FOR CARRYING OUT THE INVENTION

Figure 1:
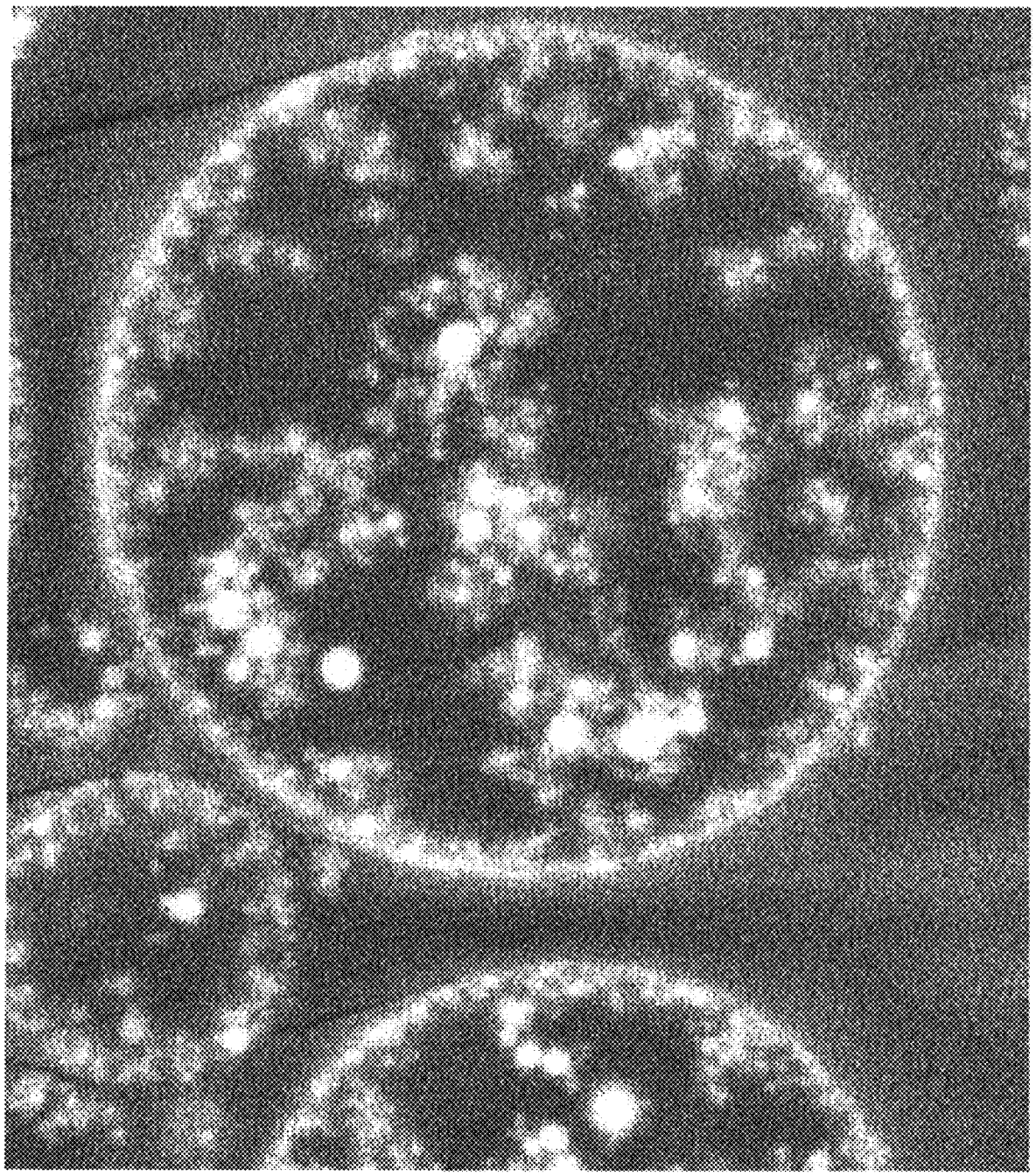
FIG. 1 is a scanning electron microscope (SEM) image showing a cross section of an organic-inorganic composite particle obtained in Example 1.

Hereinafter, the present invention will be described in detail.

[Organic-Inorganic Composite Particles]

The organic-inorganic composite particles of the present invention contain: a vinyl polymer that is a polymer of a polymerizable vinyl monomer; and inorganic particles including at least one of inorganic oxide and inorganic nitride. The thermal conductivity of the inorganic particles is 10 W/(m·K) or more. The inorganic particles are subjected to a surface treatment by acidic phosphoric acid ester having no polymerizable functional group, and by at least one polymerizable compound selected from the group consisting of: carboxylic acid having a polymerizable functional group; acidic phosphoric acid ester having a polymerizable functional group; and lactone having a polymerizable functional group. The at least one polymerizable compound is bonded to the vinyl polymer. The inorganic particles are unevenly located on a surface layer of the organic-inorganic composite particle so that the inorganic particles form one or more layers. Part of the inorganic particles may be located in an inner part of the surface layer of the organic-inorganic composite particle.

The volume average particle diameter of the organic-inorganic composite particles of the present invention is not particularly limited, however, it is preferably within the range from 0.1 to 100 μm. The organic-inorganic composite particles having the volume average particle diameter that falls within the above range can be suitably used as a thermally conductive filler for a resin composition such as an epoxy resin.

[Vinyl Polymer]

The vinyl polymer of the present invention is a polymer of the polymerizable vinyl monomer. The polymerizable vinyl monomer is a compound having a polymerizable carbon-carbon double bond (a vinyl bond in a wide sense). The polymerizable vinyl monomer that can be used in the present invention is not particularly limited. Examples thereof include a monofunctional vinyl monomer having an ethylenic unsaturated group (an alkenyl group, i.e. a vinyl group in a wide sense) and a polyfunctional vinyl monomer having two or more ethylenic unsaturated groups (alkenyl groups, i.e. vinyl groups in a wide sense).

Examples of the monofunctional vinyl monomer include: α-methylene aliphatic monocarboxylic acid ester; styrene; styrene derivatives such as o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene and 3,4-dichlorostyrene; vinyl carboxylates such as vinyl acetate, vinyl propionate and vinyl butylate; acrylic acid derivatives other than acrylic acid ester, i.e., acrylonitrile, acrylamide and the like; and methacrylic acid derivatives other than methacrylic acid ester, i.e., methacrylonitrile, methacrylamide and the like.

Examples of the α-methylene aliphatic monocarboxylic acid ester include: acrylic acid esters such as methyl acrylate, ethyl acrylate, propyl acrylate, n-butyl acrylate, isobutyl acrylate, n-octyl acrylate, dodecyl acrylate, 2-ethylhexyl acrylate, stearyl acrylate, lauryl acrylate, 2-chloroethyl acrylate, phenyl acrylate, 2-(dimethylamino)ethyl acrylate, 2-(diethylamino)ethyl acrylate, 2-hydroxyethyl acrylate, and 2-hydroxypropyl acrylate; methacrylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, lauryl methacrylate, phenyl methacrylate, 2-(dimethylamino)ethyl methacrylate, 2-(diethylamino)ethyl methacrylate, 2-hydroxyethyl methacrylate, and 2-hydroxypropyl methacrylate; and α-haloacrylic acid ester such as methyl α-chloroacrylate.

Depending on the circumstances, it is possible to use unsaturated carboxylic acids such as acrylic acid, methacrylic acid, maleic acid and fumaric acid as the monofunctional vinyl monomer. Any combination of at least two thereof may also be used. Furthermore, as the monofunctional vinyl monomer, it is possible to use any one or any combination of at least two out of the following, provided that it does not prevent the effects of the present invention: vinyl ethers such as methyl vinyl ether, ethyl vinyl ether, and isobutyl vinyl ether; vinyl ketones such as methyl vinyl ketone, hexyl vinyl ketone, and methyl isopropenyl ketone; N-vinyl compounds such as N-vinylpyrrole, N-vinylcarbazole, N-vinylindole, and N-vinylpyrrolidone; and vinylnaphthalene.

It is preferable that the monofunctional vinyl monomer is at least one selected from the group consisting of: α-methylene aliphatic monocarboxylic acid ester; styrene; and a styrene derivative. When the monofunctional vinyl monomer is at least one selected from the above group, it is advantageous in that: the monofunctional vinyl monomer is versatile; the vinyl polymer and the organic-inorganic composite particles can be relatively easily atomized; and the organic-inorganic composite particles prepared from the monofunctional vinyl monomer as the ingredient can be widely applied. It is further preferable that the monofunctional vinyl monomer is at least one of styrene and methyl methacrylate because of the inexpensiveness.

Examples of the polyfunctional vinyl monomer include: di (α-methylene aliphatic carboxylic acid) esters such as ethylene glycol dimethacrylate, and polyethylene glycol dimethacrylate; aromatic divinyl compounds such as divinylbenzene; and polyfunctional isocyanurate. It is possible to obtain the organic-inorganic composite particle containing a nucleus constituted of the cross-linked vinyl polymer using the polyfunctional vinyl monomer as the polymerizable vinyl monomer.

It is preferable that the polymerizable vinyl monomer contains both the monofunctional vinyl monomer and the polyfunctional vinyl monomer. In this way, it is possible to form good cross-linked structures in the vinyl polymer and to give an excellent solvent resistance to the organic-inorganic composite particles. The amount of the polyfunctional vinyl monomer to be used is preferably within the range from 0.5 to 50 wt % based on the total amount of the polymerizable vinyl monomer, and further preferably, within the range from 1 to 40 wt %. Thus, it is possible to form more excellent cross-linked structures in the vinyl polymer and to give more excellent solvent resistance to the organic-inorganic composite particles.

[Inorganic Particles]

The thermal conductivity of the inorganic particles is 10 W/(m·K) or more. When the thermal conductivity of the inorganic particles is less than 10 W/(m·K), the thermal conductivity of the organic-inorganic composite particles is also reduced, which results in the organic-inorganic composite particles that cannot be used as a preferable thermally conductive filler.

As the inorganic particles, it is possible to use publicly known inorganic particles that include at least one of the inorganic oxide and the inorganic nitride, and that have the thermal conductivity of 10 W/(m·K) or more. Examples of the inorganic particles include, but not limited to: inorganic oxide particles such as aluminum oxide (alumina) particles (thermal conductivity: 15 to 38 W/(m·K)), and zinc oxide particles (thermal conductivity: 20 to 54 W/(m·K)); and inorganic nitride particles such as boron nitride particles (thermal conductivity: 40 to 210 W/(m·K)), aluminum nitride particles (thermal conductivity: 70 to 270 W/(m·K)), and silicon nitride particles (thermal conductivity: 25 to 80 W/(m·K)). The inorganic particles may have the spherical shape or the amorphous shape. Also, it is possible to use a single kind of the inorganic particles or any combination of two or more kinds of the above inorganic particles.

It is preferable that the inorganic particles are the aluminum oxide (alumina) particles, the boron nitride particles or the aluminum nitride particles. When the inorganic particles are the aluminum oxide particles or the boron nitride particles, it is advantageous in that: the organic-inorganic composite particles can be stably produced thanks to excellent water resistance and thermal stability; and the organic-inorganic composite particles can be realized at low cost because the inorganic particles are inexpensive. In contrast, when the inorganic particles are the aluminum nitride particles, it is advantageous in that the thermal conductivity of the organic-inorganic composite particles can be made relatively high by adding a small amount of inorganic particles because the thermal conductivity of the inorganic particles is high.

The average particle diameter of the inorganic particles is preferably as small as possible. In particular, the average particle diameter of the inorganic particles is preferably within the range from 0.1 to 50 μm, more preferably within the range from 0.1 to 10 μm, and further preferably within the range from 0.2 to 10 μm. When the average particle diameter of the inorganic particles is more than 50 μm, there are variations in the shape of the organic-inorganic composite particles because the inorganic particles are large compared to the vinyl polymer, which leads to an undesirable result, i.e. variations in the thermal conductivity. Also, when the average particle diameter of the inorganic particles is more than 50 μm, the organic-inorganic composite particles may not be obtained since the inorganic particles fall off the vinyl polymer. In contrast, when the average particle diameter of the inorganic particles is less than 0.1 μm, a polymerizable mixture that is obtained by mixing the inorganic particles with the polymerizable vinyl monomer has a high viscosity and thus it may be difficult to adjust the particle diameter of the organic-inorganic composite particles obtained using the polymerizable mixture. In the present description, the "average particle diameter" of the inorganic particles means a particle diameter in which the cumulative fraction in the volume-based particle diameter distribution measured by a laser diffraction particle size analyzer is 50% (i.e. median diameter).

The inorganic particles are unevenly located on the surface layer of the organic-inorganic composite particle so as to form one or more layers. When the inorganic particles are not unevenly located on the surface layer of the organic-inorganic composite particle and therefore the inorganic particles do not form one or more layers, and when such obtained organic-inorganic composite particles are used as the thermally conductive filler, a sufficient thermal conductivity may not be given to a composition to which the thermally conductive filler is added. Also, it is preferable that the inorganic particles are unevenly located on the surface layer of the organic-inorganic composite particle so as to form two or more layers.

It is preferable that the inorganic particles in an amount of 10 to 80 wt % are contained in the organic-inorganic composite particles. When the inorganic particles in an amount less than 10 wt % are contained in the organic-inorganic composite particles and such obtained organic-inorganic composite particles are used as the thermally conductive filler, a sufficient thermal conductivity may not be given to a composition to which the thermally conductive filler is added. When the inorganic particles in an amount more than 80 wt % are contained in the organic-inorganic composite particles at the time of manufacturing the organic-inorganic composite particles using the polymerizable mixture that is obtained by mixing the inorganic particles with the polymerizable vinyl monomer, such a polymerizable mixture has a high viscosity and thus it may be difficult to adjust the particle diameter of the organic-inorganic composite particles. Also, when the inorganic particles in an amount more than 80 wt % are contained in the organic-inorganic composite particles and furthermore the organic-inorganic composite particles are manufactured by suspension polymerization, aggregation may be likely to occur during the suspension polymerization because a number of inorganic particles may be likely to transfer from the oil droplet phase to the aqueous phase.

[Acidic Phosphoric Acid Ester Having No Polymerizable Functional Group]

The surfaces of the inorganic particles are treated by acidic phosphoric acid ester having no polymerizable functional group (i.e. at least one of phosphoric acid monoester and phosphoric acid diester).

The acidic phosphoric acid ester having no polymerizable functional group is not particularly limited, however, preferably it is an acidic phosphoric acid ester expressed by the general formula (1):

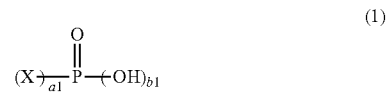

wherein one of a1 and b1 represents 1 while the other of a1 and b1 represents 2, and X represents a substituent expressed by the general formula (1-1) below, or a substituent made by bonding, to the substituent expressed by the general formula (1-1), at least one linking group expressed by the general formulae (1-2) below, the linking groups expressed by the general formulae (1-2) being bonded to a phosphorus atom in the above general formula (1) on an oxygen atom side directly or via another linking group:

wherein $R_1$ represents a C1-C50 linear or branched saturated hydrocarbon group or a C6-C100 aromatic ring-containing hydrocarbon group, and t1 represents 0 or 1; and

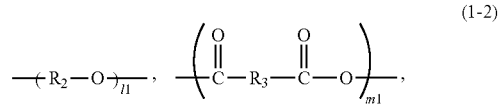

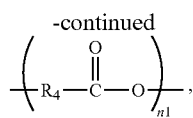

wherein $R_2$, $R_3$ and $R_4$ each represent either a C1-C18 divalent aliphatic hydrocarbon group that may be substituted with an ether bond-containing group or a C6-C30 divalent aromatic ring-containing hydrocarbon group that may be substituted with an ether bond-containing group, and l1, m1 and n1 each represent an integer molar ratio to 1 mole of the substituent expressed by the above general formula (1-1), specifically, l1, m1 and n1 meet the following expressions: $l1+m1+n1 \leq 200$; $1 \leq l1 \leq 200$; $1 \leq m1 \leq 200$; and $1 \leq n1 \leq 200$.

Examples of the C1-C50 linear or branched saturated hydrocarbon group as $R_1$ in the above general formula (1-1) include linear or branched alkyl groups such as: a methyl group; an ethyl group; a propyl group (n-propyl group, iso-propyl group, etc.); a butyl group (n-butyl group, tert-butyl group, sec-butyl group, etc.); a pentyl group (n-pentyl group, isopentyl group, neopentyl group, etc.); a hexyl group (n-hexyl group, 2-methyl pentyl group, 3-methyl pentyl group, 2,2-dimethyl butyl group, 2,3-dimethyl butyl group, etc.); a heptyl group (n-heptyl group, 2-methyl hexyl group, 3-methyl hexyl group, 2,2-dimethyl pentyl group, 2,3-dimethyl pentyl group, 2,4-dimethyl pentyl group, 3-ethyl pentyl group, 2,2,3-trimethyl butyl group, etc.); an octyl group (n-octyl group, methyl heptyl group, dimethyl hexyl group, 2-ethyl hexyl group, 3-ethyl hexyl group, trimethyl pentyl group, 3-ethyl-2-methyl pentyl group, 2-ethyl-3-methyl pentyl group, 2,2,3,3-tetramethyl butyl group, etc.); a nonyl group (n-nonyl group, methyl octyl group, dimethyl heptyl group, 3-ethyl heptyl group, 4-ethyl heptyl group, trimethyl hexyl group, 3,3-diethyl pentyl group, etc.); a decyl group; an isodecyl group; an undecyl group; a dodecyl group; a tridecyl group, a stearyl group; and an isostearyl group.

The saturated hydrocarbon group preferably has the carbon number of 1 to 25, more preferably 1 to 18, and especially preferably 1 to 12. Among the above-listed saturated hydrocarbon groups, the linear or branched alkyl group having the carbon number of 1 to 10 is preferable. The methyl group, the ethyl group, the propyl group (n-propyl group, iso-propyl group, etc.), the butyl group (n-butyl group, tert-butyl group, sec-butyl group, etc.), the octyl group (n-octyl group, methyl heptyl group, dimethyl hexyl group, 2-ethyl hexyl group, 3-ethyl hexyl group, etc.), and the decyl group are further preferable. The octyl group and the decyl group are the most preferable. Also, $R_1$ in the above general formula (1-1) is preferably a linear or branched saturated hydrocarbon group having the carbon number of 8 to 13.

The C6-C100 aromatic ring-containing hydrocarbon group as $R_1$ preferably has 1 to 5 rings, and more preferably 1 to 3 rings. When it has two or more rings, such two or more rings may be condensed. When the aromatic ring-containing hydrocarbon group has two or more rings, at least one ring of them is an aromatic ring. Also, when the aromatic ring-containing hydrocarbon group has two or more aromatic rings, apart from the fact that the two or more aromatic rings may be condensed, the two or more aromatic rings may be directly bonded to each other by sigma bond.

Examples of the aromatic ring-containing hydrocarbon group include: a phenyl group; a naphthyl group; a pentalenyl group; an indenyl group; an anthranyl group; a phenanthryl group; a fluorenyl group; and a biphenylenyl group. The phenyl group and the naphthyl group are preferable, and the phenyl group is more preferable.

In the above general formulae (1-2), l1, m1 and n1 each represent an integer molar ratio to 1 mole of the substituent expressed by the above general formula (1-1), specifically, l1, m1 and n1 meet the following expressions: $l1+m1+n1 \leq 200$; $1 \leq l1 \leq 200$; $1 \leq m1 \leq 200$; and $1 \leq n1 \leq 200$. It is preferable that l1, m1 and n1 each fall within the range from 1 to 100, more preferably, within the range from 1 to 50, and further preferably, within the range of 1 to 30. Also, the value of the l1+m1+n1 is preferably not more than 100, more preferably not more than 50, and further preferably not more than 30.

In the above general formulae (1-2), $R_2$, $R_3$ and $R_4$ each represent either a C1-C18 divalent aliphatic hydrocarbon group or a C6-C30 divalent aromatic ring-containing hydrocarbon group. Examples of the C1-C18 divalent aliphatic hydrocarbon group as $R_2$, $R_3$ and $R_4$ include linear or branched ring structure-containing divalent aliphatic hydrocarbon groups such as: a methylene group; an ethylene group; an n-propylene group (trimethylene group); an iso-propylene group; an n-butylene group (tetramethylene group); a tert-butylene group; a sec-butylene group; an n-pentylene group (pentamethylene group); an isopentylene group; a neopentylene group; a cyclopentylene group; an n-hexylene group (hexamethylene group); a cyclohexylene group; a 2-methyl pentylene group; a 3-methyl pentylene group; a 2,2-dimethyl butylene group; a 2,3-dimethyl butylene group; an n-heptylene group (heptamethylene group); a 2-methyl hexylene group; a 3-methyl hexylene group; a 2,2-dimethyl pentylene group; a 2,3-dimethyl pentylene group; a 2,4-dimethyl pentylene group; a 3-ethyl pentylene group; a 2,2,3-trimethyl butylene group; an n-octylene group (octamethylene group); a methyl heptylene group; a dimethyl hexylene group; a 3-ethyl hexylene group; a trimethyl pentylene group; a 3-ethyl-2-methyl pentylene group; a 2-ethyl-3-methyl pentylene group; a 2,2,3,3-tetramethyl butylene group; an n-nonylene group (nonamethylene group); a methyl octylene group; a dimethyl heptylene group; a 3-ethyl heptylene group; a 4-ethyl heptylene group; a trimethyl hexylene group; a 3,3-diethyl pentylene group; an n-decylene group (decamethylene group); an isodecylene group; an undecylene group; a dodecylene group; a tridecylene group; a tetradecylene group; a pentadecylene group; a hexadecylene group; a heptadecylene group; an octadecylene group; and an isooctadecylene group. The divalent aliphatic hydrocarbon group is preferably a C1-C8 divalent aliphatic hydrocarbon group. The methylene group, the ethylene group, the n-propylene group, the iso-propylene group, the n-butylene group, the tert-butylene group and the sec-butylene group are more preferable, and the ethylene group and the iso-propylene group are the most preferable.

The C6-C30 divalent aromatic ring-containing hydrocarbon group as $R_2$, $R_3$ and $R_4$ preferably has 1 to 5 rings, and more preferably 1 to 3 rings. When it has two or more rings, such two or more rings may be condensed. Examples of the C6-C30 divalent aromatic ring-containing hydrocarbon group as $R_2$, $R_3$ and $R_4$ include: a phenylene group; a naphthylene group; a pentalenylene group; an indenylene group; an anthranylene group; a phenanthrylene group; a fluorenylene group; and a biphenylenylene group.

In the C1-C18 divalent aliphatic hydrocarbon group and the C6-C30 divalent aromatic ring-containing hydrocarbon group that constitute $R_2$, $R_3$ and $R_4$, the hydrogen atom may be substituted with the ether bond-containing group. Examples of the ether bond-containing group include the various substituents in which an ether bond (—O—) is bonded to a bonding site of the C1-C50 saturated hydrocarbon group or to the C6-C100 aromatic ring-containing hydrocarbon group, both described in detail in the recitation of $R_1$. Among them, an alkoxy group, which is expressed by "—O—$C_nH_{2n+1}$ (where n represents an integer of 1 to 18)", is preferable as the ether bond-containing group.

[Carboxylic Acid Having Polymerizable Functional Group, Acidic Phosphoric Acid Ester Having Polymerizable Functional Group, and Lactone Having Polymerizable Functional Group]

The inorganic particle is further subjected to a surface treatment by at least one polymerizable compound selected from the group consisting of: carboxylic acid having a polymerizable functional group; acidic phosphoric acid ester having a polymerizable functional group; and lactone having a polymerizable functional group. In this way, the polymerizable functional group can be bonded to the inorganic particle such that the at least one polymerizable compound is covalently bonded to the vinyl polymer and exists on the inorganic particle. Thus, it is possible to prevent the inorganic particles from falling off the vinyl polymer.

The at least one polymerizable compound is not particularly limited, however, preferably it is at least one polymerizable compound selected from the group consisting of: acidic phosphoric acid ester expressed by the general formula (2) below; carboxylic acid expressed by the general formula (3) below; and lactone expressed by the general formula (4) below:

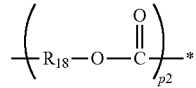
(2)

wherein one of a2 and b2 represents 1 while the other of a1 and b1 represents 2, and Y represents a substituent expressed by the general formula (2-1) below, or a substituent made by bonding, to the substituent expressed by the general formula (2-1), at least one linking group expressed by the general formulae (2-2) to (2-5) below, the linking groups expressed by the general formulae (2-2) to (2-5) being bonded to a phosphorus atom in the above general formula (2) on the side indicated by the reference sign "*" directly or via another linking group:

(2-1)

wherein $R_5$ represents a C1-C18 linear or branched alkenyl group, and q2 and t2 independently represent 0 or 1, and

(2-2)

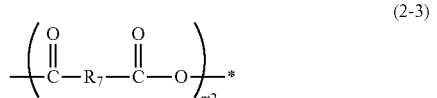
(2-3)

(2-4)

(2-5)

wherein $R_6$, $R_7$, $R_8$ and $R_{18}$ each represent either a C1-C18 divalent aliphatic hydrocarbon group that may be substituted with an ether bond-containing group or a C6-C30 divalent aromatic ring-containing hydrocarbon group that may be substituted with an ether bond-containing group, and l2, m2, n2 and p2 each represent an integer molar ratio to 1 mole of the substituent expressed by the above general formula (2-1), specifically, l2, m2, n2 and p2 meet the following expressions: l2+m2+n2+p2≤200; 1≤l2≤200; 1≤m2≤200; 1≤n2≤200, and 1≤p2≤200,

(3)

wherein Z represents a C1-C18 linear or branched alkenyl group, or a substituent made by bonding, to the C1-C18 linear or branched alkenyl group, at least one linking group expressed by the general formulae (3-1) to (3-4) below, the linking groups expressed by the general formulae (3-1) to (3-4) being bonded to a carbon atom in the above general formula (3) on the side indicated by the reference sign "*" directly or via another linking group:

(3-1)

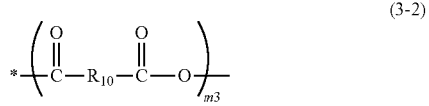
(3-2)

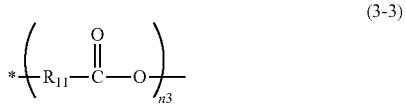
(3-3)

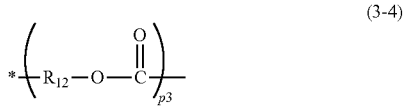
(3-4)

wherein $R_9$, $R_{10}$, $R_{11}$ and $R_{12}$ each represent either a C1-C18 divalent aliphatic hydrocarbon group that may be substituted with an ether bond-containing group or a C6-C30 divalent aromatic ring-containing hydrocarbon group that may be substituted with an ether bond-containing group, and l3, m3, n3 and p3 each represent an integer molar ratio to 1 mole of the above C1-C18 linear or branched alkenyl group, specifically, l3, m3, n3 and p3 meet the following expressions: l3+m3+n3+p3≤200; 1≤l3≤200; 1≤m3≤200; 1≤n3≤200, and 1≤p3≤200, and

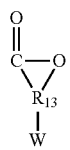
(4)

wherein $R_{13}$ represents a C1-C7 trivalent hydrocarbon group, and W represents a substituent expressed by the general formula (4-1) below, or a substituent made by bonding, to the substituent expressed by the general formula (4-1), at least one linking group expressed by the general formulae (4-2) below, the linking groups expressed by the general formulae (4-2) being bonded to $R_{13}$ expressed in the general formula (4) on the oxygen atom side directly or via another linking group:

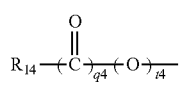
(4-1)

wherein $R_{14}$ represents a C1-C18 linear or branched alkenyl group, and q4 and t4 independently represent 0 or 1, and

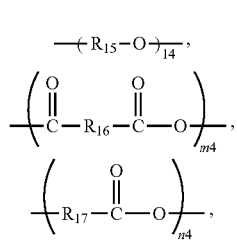
(4-2)

wherein $R_{15}$, $R_{16}$ and $R_{17}$ each represent either a C1-C18 divalent aliphatic hydrocarbon group that may be substituted with an ether bond-containing group or a C6-C30 divalent aromatic ring-containing hydrocarbon group that may be substituted with an ether bond-containing group, and l4, m4 and n4 each represent an integer molar ratio to 1 mole of the substituent expressed by the above general formula (4-1), specifically, l4, m4 and n4 meet the following expressions: l4+m4+n4≤200; 1≤l4≤200; 1≤m4≤200; and 1≤n4 200.

Examples of the C1-C18 linear or branched alkenyl group as $R_5$, Z and $R_{14}$ in the above general formulae (2-1), (3) and (4-1) include linear or branched alkenyl groups such as: a vinyl group; a propenyl group (allyl group, 1-methyl vinyl group, etc.); a butenyl group (1-butenyl group, 2-butenyl group, 3-butenyl group, 1-methyl allyl group, 2-methyl allyl group, etc.); a pentenyl group (1,1-dimethyl allyl group, etc.); a nonenyl group; a decenyl group; an octadecenyl group; a palmitoleyl group; an oleyl group; a linoyl group; and a linoleyl group. Among the above alkenyl groups, a C2-C4 linear or branched alkenyl group is preferable. The vinyl group, the propenyl group (allyl group, 1-methyl vinyl group, etc.) and the butenyl group (1-methyl allyl group, 2-methyl allyl group, etc.) are more preferable. The 1-methyl vinyl group (isopropenyl group) is the most preferable.

It is especially preferable that Z in the above general formula (3) is a substituent made by bonding, to the C1-C18 linear or branched alkenyl group, at least one linking group including the linking group expressed by the above general formula (3-4), and furthermore, the linking group expressed by the above general formula (3-4) is directly bonded to the C1-C18 linear or branched alkenyl group. Also it is especially preferable that both q2 and t2 in the above general formula (2-1) are 1. Furthermore, it is especially preferable that both q4 and t4 in the above general formula (4-1) are 1.

Examples of the C1-C18 divalent aliphatic hydrocarbon group as $R_6$, $R_7$, $R_8$, $R_{18}$, $R_9$, $R_{10}$, $R_{11}$, $R_{12}$, $R_{15}$, $R_{16}$ and $R_{17}$ in the above general formulae (2-2), (2-3), (2-4), (2-5), (3-1), (3-2), (3-3), (3-4) and (4-2) include the various divalent aliphatic hydrocarbon groups listed as the examples of the C1-C18 divalent aliphatic hydrocarbon group as $R_2$, $R_3$ and $R_4$. The C1-C18 divalent aliphatic hydrocarbon group as $R_6$ is more preferably a C1-C8 divalent aliphatic hydrocarbon group. The methylene group, the ethylene group, the n-propylene group, the iso-propylene group, the n-butylene group, the tert-butylene group, the sec-butylene group and the n-pentylene group are further preferable. The ethylene group, the iso-propylene group and the n-pentylene group are especially preferable. The C1-C18 divalent aliphatic hydrocarbon group as $R_7$, $R_8$, $R_{18}$, $R_9$, $R_{10}$, $R_{11}$, $R_{12}$, $R_{15}$, $R_{16}$ and $R_{17}$ is more preferably a C1-C8 divalent aliphatic hydrocarbon group. The methylene group, the ethylene group, the n-propylene group, the iso-propylene group, the n-butylene group, the tert-butylene group and the sec-butylene group are further preferable. The ethylene group and the iso-propylene group are especially preferable.

The C6-C30 divalent aromatic ring-containing hydrocarbon group as $R_6$, $R_7$, $R_8$, $R_{18}$, $R_9$, $R_{10}$, $R_{11}$, $R_{12}$, $R_{15}$, $R_{16}$ and $R_{17}$ preferably has 1 to 5 rings, and more preferably 1 to 3 rings. When it has two or more rings, such two or more rings may be condensed. Examples of the C6-C30 divalent aromatic ring-containing hydrocarbon group as $R_6$, $R_7$, $R_8$, $R_{18}$, $R_9$, $R_{10}$, $R_{11}$, $R_{12}$, $R_{15}$, $R_{16}$ and $R_{17}$ include the various divalent aromatic ring-containing hydrocarbon groups listed as the examples of the C6-C30 divalent aromatic ring-containing hydrocarbon group as $R_2$, $R_3$ and $R_4$.

In the C1-C18 divalent aliphatic hydrocarbon group and the C6-C30 divalent aromatic ring-containing hydrocarbon group that constitute $R_6$, $R_7$, $R_8$, $R_{18}$, $R_9$, $R_{10}$, $R_{11}$, $R_{12}$, $R_{15}$, $R_{16}$ and $R_{17}$, the hydrogen atom may be substituted with the ether bond-containing group. Examples of the ether bond-containing group include the various substituents in which an ether bond (—O—) is bonded to a bonding site of the C1-C50 saturated hydrocarbon group or to the C6-C100 aromatic ring-containing hydrocarbon group, both described in detail in the recitation of Ru. Among them, an alkoxy group, which is expressed by "—O—$C_nH_{2n+1}$ (where n represents an integer of 1 to 18)", is preferable as the ether bond-containing group.

Examples of the C1-C7 trivalent hydrocarbon group as $R_{13}$ in the above general formula (4) include: a methane triyl group; an ethane triyl group; a propane triyl group (for example, propane-1,1,3-triyl group whose 1-site is bonded to the carbon atom expressed in the general formula (4)); a butane triyl group; a pentane triyl group; a hexane triyl group; and a heptane triyl group. Among the above trivalent hydrocarbon groups, a C1-C4 trivalent hydrocarbon group is preferable. The methane triyl group, the ethane triyl group and the propane triyl group are more preferable. The ethane triyl group and the propane triyl group are the most preferable.

[Method for Manufacturing Organic-Inorganic Composite Particles]

A method for manufacturing organic-inorganic composite particles of the present invention is a method for manufacturing the organic-inorganic composite particles containing: a vinyl polymer that is a polymer of a polymerizable vinyl monomer; and inorganic particles including at least one of inorganic oxide and inorganic nitride. The thermal conductivity of the inorganic particles is 10 W/(m·K) or more. The method includes the steps of: preparing hydrophobized inorganic particles by reacting, in a hydrophilic solvent, the inorganic particles, acidic phosphoric acid ester having no polymerizable functional group, and at least one porimerizable compound selected from the group consisting of carboxylic acid having a polymerizable functional group, acidic phosphoric acid ester having a polymerizable functional group, and lactone having a polymerizable functional group; preparing a polymerizable mixture by mixing the hydrophobized inorganic particles, the polymerizable vinyl monomer, and a polymerization initiator; and obtaining the organic-inorganic composite particles by suspension polymerization in which the polymerizable mixture is polymerized in an aqueous medium in the presence of a dispersant. The organic-inorganic composite particles of the present invention are manufactured by the above method. A plurality of kinds of the acidic phosphoric acid esters having no polymerizable functional group may be used. Also, a plurality of kinds of the polymerizable compounds may be used.

[Step of Preparing Hydrophobized Inorganic Particles]

A highly polar phosphate group, a highly polar carboxyl group and highly polar lactone are likely to adsorb onto the inorganic oxide or the inorganic nitride. Thus, in the above step of preparing the hydrophobized inorganic particle, by reacting the inorganic particle with the acidic phosphoric acid ester having no polymerizable functional group, the phosphate group of the acidic phosphoric acid ester having no polymerizable functional group adsorbs onto the inorganic oxide or the inorganic nitride. Also, a hydroxy group on the phosphorus atom of the acidic phosphoric acid ester having no polymerizable functional group forms the hydrogen bond with a hydroxy group on the surface of the inorganic particle. Thus, the surface of the inorganic particle is treated by the acidic phosphoric acid ester having no polymerizable functional group, and as a result, the acidic phosphoric acid ester having no polymerizable functional group can exist on the inorganic particle.

In the above step of preparing the hydrophobized inorganic particles, the inorganic particles are further reacted with at least one polymerizable compound selected from the group consisting of: the carboxylic acid having a polymerizable functional group; the acidic phosphoric acid ester having a polymerizable functional group; and the lactone having a polymerizable functional group. That is, the carboxy group, the phosphate group or the lactone of the at least one polymerizable compound adsorbs onto the inorganic oxide or the inorganic nitride. Also, when the at least one polymerizable compound includes the carboxylic acid having a polymerizable functional group or the acidic phosphoric acid ester having a polymerizable functional group, a hydroxy group on the phosphorus atom of the acidic phosphoric acid ester or a hydroxy group on the carbon atom of the carboxylic acid of the at least one polymerizable compound forms the hydrogen bond with a hydroxy group on the surface of the inorganic particle. Thus, the surface of the inorganic particle is treated by the at least one polymerizable compound, and as a result, the at least one polymerizable compound can exist on the inorganic particle.

In the above step of preparing the hydrophobized inorganic particles, the total amount of the used amount of the acidic phosphoric acid ester having no polymerizable functional group and the used amount of the at least one polymerizable compound is preferably 5 to 50 parts by weight with respect to 100 parts by weight of the inorganic particles. When the total amount is less than 5 parts by weight, aggregation may be likely to occur during the suspension polymerization because a number of inorganic particles may be likely to transfer from the oil droplet phase to the aqueous phase due to the insufficient hydrophobization. When the total amount is more than 50 parts by weight, the ratio of the inorganic particles in the hydrophobized inorganic particles decreases, which may lead to insufficient thermal conductivity of a composition to which a thermally conductive filler as the obtained organic-inorganic composite particles is added.

In the above step of preparing the hydrophobized inorganic particles, regarding the weight ratio of the used amount of the acidic phosphoric acid ester having no polymerizable functional group to the used amount of the at least one polymerizable compound, the used amount of the acidic phosphoric acid ester having no polymerizable functional group is preferably 30 to 90 wt % with respect to 100 wt % as the total amount. When the used amount of the acidic phosphoric acid ester having no polymerizable functional group is less than 30 wt %, the degree of uneven distribution of the hydrophobized inorganic particles on the surface layer of the organic-inorganic composite particle may decrease. When the used amount of the acidic phosphoric acid ester having no polymerizable functional group is more than 90 wt %, the hydrophobized inorganic particles that do not perform polymerization reaction with the vinyl monomer increase, which leads to increase in the amount of the hydrophobized inorganic particles that detach from the oil droplet. Accordingly, the amount of the hydrophobized inorganic particles that exist in the organic-inorganic composite particles may decrease.

The hydrophilic solvent that is used in the step of preparing the hydrophobized inorganic particles is not particularly limited, provided that it can solve the acidic phosphoric acid ester having no polymerizable functional group and the at least one polymerizable compound. Examples of the hydrophilic solvent include: lower alcohol having a carbon number of 1 to 4 such as methanol, ethanol, propanol, and butanol; and lower ketone such as methyl ethyl ketone, and methyl isobutyl ketone. In the hydrophilic solvent, water may exist to the extent that it does not prevent the solubility of the acidic phosphoric acid ester having no polymerizable functional group and the at least one polymerizable compound. Here, "being soluble" means that 1 g or more of the solute can be dissolved in 100 g of the solvent at room temperature (about 25° C.).

[Step of Preparing Polymerizable Mixture]

The used amount of the hydrophobized inorganic particles in the polymerizable mixture is preferably 10 to 80 wt % with respect to the total used amount of the polymerizable vinyl monomer and the hydrophobized inorganic particles. When the used amount of the hydrophobized inorganic particles is less than 10 wt %, a composition, to which a thermally conductive filler as the obtained organic-inorganic composite particles is added, may have an insufficient thermal conductivity. When the used amount of the hydrophobized inorganic particles is more than 80 wt %, the polymerizable mixture has a high viscosity, which may result in difficulty in adjustment of the particle diameter. Also, when the amount of the inorganic particles contained in the organic-inorganic composite particles is more than 80 wt %, aggregation may be likely to occur during the suspension polymerization because a number of hydrophobized inorganic particles may be likely to transfer from the oil droplet phase to the aqueous phase.

Examples of the polymerization initiator used for the polymerizable mixture include oil soluble peroxide polymerization initiators and oil soluble azo polymerization initiators. Specific examples of the polymerization initiator include: the peroxide polymerization initiators such as benzoyl peroxide, dilauroyl peroxide (lauroyl peroxide), octanoyl peroxide, ortho-chlorobenzoyl peroxide, ortho-methoxybenzoyl peroxide, methyl ethyl ketone peroxide, diisopropyl peroxydicarbonate, cumene hydroperoxide, cyclohexanone peroxide, t-butyl hydroperoxide and diisopropyl benzene hydroperoxide; and the azo polymerization initiators such as 2,2'-azobis isobutyronitrile, 2,2'-azobis(2,4-dimethyl valeronitrile), 2,2'-azobis(2,3-dimethyl butyronitrile), 2,2'-azobis(2-methyl butyronitrile), 2,2'-azobis(2,3,3-trimethyl butyronitrile), 2,2'-azobis(2-isopropyl butyronitrile), 1,1'-azobis(cyclohexane-1-carbonitrile), 2,2'-azobis(4-methoxy-2,4-dimethyl valeronitrile), (2-carbamoylazo)isobutyronitrile, 4,4'-azobis(4-cyanovaleric acid), dimethyl-2,2'-azobisisobutyrate, and 1,1'-azobis(1-acetoxy-1-phenylethane).

[Step of Obtaining Organic-Inorganic Composite Particles by Suspension Polymerization]

In the step of obtaining the organic-inorganic composite particles by suspension polymerization, the polymerizable functional group contained in the at least one polymerizable compound of the hydrophobized inorganic particle is copolymerized with the polymerizable vinyl monomer, so that the vinyl polymer bonded to the at least one polymerizable compound (more specifically, hidrophobized functional group derived from the polymerizable compound) is formed.

Before the commencement of the polymerization, the hydrophobized inorganic particles are dispersed in the oil droplet of the polymerizable mixture. As the polymerization proceeds, the hydrophobized inorganic particles are phase-separated and gather on the surface of the oil droplet. As a result, the organic-inorganic composite particles are obtained, on the surfaces of which the hydrophobized inorganic particles are unevenly located so as to form one or more layers. If the hydrophobized inorganic particles are subjected to the surface treatment by only the at least one polymerizable compound, the vinyl monomer is sufficiently copolymerized with the polymerizable functional groups of the hydrophobized inorganic particles because a number of polymerizable functional groups exist on the surfaces of the hydrophobized inorganic particles. Thus, the hydrophobized inorganic particles are uniformly dispersed in the organic-inorganic composite particle without unevenly locating, and accordingly, it is not possible to obtain the organic-inorganic composite particle, on the surface of which the hydrophobized inorganic particles are unevenly located so as to form one or more layers. On the other hand, if the hydrophobized inorganic particles are subjected to the surface treatment by only the acidic phosphoric acid ester having no polymerizable functional group, the vinyl monomer is not bonded to the hydrophobized inorganic particles because no polymerizable functional group exists on the surfaces of the hydrophobized inorganic particles. Thus, as the polymerization of the vinyl monomer proceeds, the hydrophobized inorganic particles move so as to be pushed out from the inside to the outside of the oil droplet, and consequently, the particles are detached from the oil droplet (vinyl polymer particles). As a result, the hydrophobized inorganic particles are hardly exist in the obtained organic-inorganic composite particle. In the present invention, the hydrophobized inorganic particles are subjected to the surface treatment by both the acidic phosphoric acid ester having no polymerizable functional group and the at least one polymerizable compound, it is possible to avoid separation of the hydrophobized inorganic particles from the oil droplet, and thus to maintain the hydrophobized inorganic particles in the oil droplet. Therefore, it is possible to gather the hydrophobized inorganic particles on the surface of the oil droplet without uniformly dispersing the hydrophobized inorganic particles in the oil droplet.

The dispersant used for the suspension polymerization is to improve dispersibility of the polymerizable mixture in the aqueous medium. The dispersant is not particularly limited provided that it is conventionally used for the suspension polymerization of the polymerizable vinyl monomer. Examples of the dispersant include: water-soluble polymers such as polyvinyl alcohol, methyl cellulose, polyacrylamide, and polyvinyl pyrrolidone; and poorly soluble inorganic compounds such as calcium tertiary phosphate, magnesium pyrophosphate, magnesium oxide, and hydroxyapatite.

When the poorly soluble inorganic compound is used as the dispersant, it is preferable that the suspension polymerization is performed using, together with such a dispersant, an anionic surfactant. Examples of the anionic surfactant include: carboxylate salts such as fatty acid soap, N-acyl amino acid salt, and alkyl ether carboxylate salt; sulfonate salts such as alkyl benzene sulfonate salt, alkyl naphthalene sulfonate salt, dialkyl sulfosuccinate ester salt, alkyl sulfoacetate salt, and α-olefin sulfonate salt; sulfate ester salts such as higher alcohol sulfate ester salt, secondary higher alcohol sulfate ester salt, alkyl ether sulfate salt, and polyoxyethylene alkyl phenyl ether sulfate salt; and phosphate ester salts such as alkyl ether phosphate ester salt, and alkyl phosphate ester salt.

The aqueous medium used for the suspension polymerization is not particularly limited. Examples of the aqueous medium include: water; and a mixture of water with a lower alcohol (e.g. methanol and ethanol).

[Thermally Conductive Filler]

The organic-inorganic composite particles of the present invention are suitable for the thermally conductive filler used for a heat dissipation sheet or a thermal grease.

[Thermally Conductive Resin Composition and Method for Manufacturing Thermally Conductive Resin Composition]

The thermally conductive resin composition of the present invention includes the organic-inorganic composite particles of the present invention and a matrix resin (base resin). The matrix resin is not particularly limited. Examples of the matrix resin include: a silicone resin; an epoxy resin; a thermosetting polyimide resin; a phenol resin; a urea resin; a melamine resin; an unsaturated polyester resin; a diallyl phthalate resin; and a thermosetting urethane resin. The content of the matrix resin in the thermally conductive resin composition is preferably in the range from 10 to 100 parts by weight with respect to 100 parts by weight of the organic-inorganic composite particles. When the content of the matrix resin is not more than 100 parts by weight with respect to 100 parts by weight of the organic-inorganic composite particles, the thermally conductive resin composition can have a sufficient thermal conductivity derived from the organic-inorganic composite particles. Also, when the content of the matrix resin is not less than 10 parts by weight with respect to 100 parts by weight of the organic-inorganic composite particles, the thermally conductive resin composition can be easily formed.

The thermally conductive resin composition of the present invention can be manufactured by mixing the organic-inorganic composite particles with the matrix resin after the organic-inorganic composite particles are manufactured by the above-described manufacturing method of the present invention.

Also, the thermally conductive resin composition of the present invention can be used, for example, as a heat dissipation sheet or a thermal grease to release heat from the heating element such as an electronic component. When the thermally conductive resin composition of the present invention is used as the heat dissipation sheet, the cured sheet-like thermally conductive resin composition can be formed by molding the thermally conductive resin composition by thermal compression molding or the like. When the thermally conductive resin composition of the present invention is used as the thermal grease, silicone grease or the like can be used as the matrix resin.

EXAMPLES

Hereinafter, the present invention is described by the Examples and the Comparative Examples. However, the present invention is not limited thereto. First, the following measuring/determining methods in the Examples and the Comparative Examples are described: a method for measuring the volume average particle diameter of the organic-inorganic composite particles; a method for measuring the content of the inorganic particles in the organic-inorganic composite particles; a method for measuring the number of layers of the inorganic particles that are unevenly located on the surface layer of the organic-inorganic composite particle; and a method for determining whether the inorganic particles are unevenly located on the surface layer of the organic-inorganic composite particle so as to form one or more layers.

[Method for Measuring Volume Average Particle Diameter of Organic-Inorganic Composite Particles]

The volume average particle diameter of the organic-inorganic composite particles is measured by Coulter Multisizer™ 3 (a measurement device manufactured by Beckman Coulter, Inc.). Note that the measurement is performed using the aperture calibrated according to the user's manual of Multisizer™ 3 issued by Beckman Coulter, Inc.

The aperture used for the measurement is appropriately selected according to the size of the organic-inorganic composite particles. When the aperture having the size of 50 μm is selected, the "Current" (aperture current) is set to −800 and the "Gain" is set to 4.

As the measurement sample, the dispersion is used, which is obtained by dispersing 0.1 g of organic-inorganic composite particles in 10 mL of 0.1 wt % nonionic surfactant aqueous solution using a touch mixer ("TOUCHMIXER MT-31" manufactured by Yamato Scientific Co., Ltd.) and an ultrasonic cleaner ("ULTRASONIC CLEANER VS-150" manufactured by VELVO-CLEAR Co., Ltd.). During measurement, the content of the beaker is being loosely stirred to the extent that no air bubble enters. The measurement is terminated when a hundred thousand organic-inorganic composite particles have been measured. The volume average particle diameter of the organic-inorganic composite particles is the arithmetic mean of the volume particle size distribution of the hundred thousand organic-inorganic composite particles.

[Method for Measuring Content of Inorganic Particles in Organic-Inorganic Composite Particle]

In the organic-inorganic composite particles obtained in the Examples and the Comparative Examples described later, the ignition residue is approximately the same as the content (wt %) of the inorganic particles. Thus, the ignition residue measured by the method for measuring the ignition residue described below is considered as the content (wt %) of the inorganic particles.

[Method for Measuring Ignition Residue]

The organic-inorganic composite particles were weighed to prepare 1.0 g thereof. The weighed organic-inorganic composite particles were burnt in an electric furnace at 550° C. for 30 minutes. Then, the weight (g) of the residue was measured. The measured weight of the residue (g) was divided by the weight of the organic-inorganic composite particles before measurement (1.0 g), and the obtained value was converted into percentage. Thus, the ignition residue (wt %) was obtained.

[Method for Measuring Number of Layers of Inorganic Particles Unevenly Located on Surface Layer of Organic-Inorganic Composite Particle]

The backscattered electron images of the cross-section of the organic-inorganic composite particles obtained in the respective Examples and Comparative Examples were observed with a SEM of 5000 magnifications. Regarding white parts, which correspond to the inorganic particles, respective sizes of 100 white parts in the direction from the surface to the center of the organic-inorganic composite particle were measured. An average value of the sizes of the measured 100 white parts was divided by the average particle diameter of the inorganic particles, and the thus calculated value was defined as the number of layers of the inorganic particles unevenly located on the surface layer of the organic-inorganic composite particle. When the organic-inorganic composite particle contains two or more kinds of inorganic particles, an integrated value of respective values obtained by multiplying the volume fraction for each kind of inorganic particles by the corresponding average particle diameter was defined as a mixed average particle diameter. Then, an average value of the sizes of the measured 100 white parts was divided by the mixed average particle diameter, and the thus calculated value was defined as the number of layers of the inorganic particles unevenly located on the surface layer of the organic-inorganic composite particle.

[Method for Determining Whether Inorganic Particles are Unevenly Located on Surface Layer of Organic-Inorganic Composite Particle to Form One or More Layers]

When the number of the layers of the inorganic particles unevenly located in the surface layer of the organic-inorganic composite particle was one or more as a result of the measurement by the method described in the previous paragraph, it was determined that the inorganic particles unevenly existed on the surface layer of the organic-inorganic composite particle so as to form one or more layers (in the Table shown later, this result is indicated by "YES"). When the number of the layers of the inorganic particles unevenly located in the surface layer of the organic-inorganic composite particle was less than one as a result of the measurement by the method described in the previous paragraph, it was determined that the inorganic particles did not unevenly exist on the surface layer of the organic-inorganic composite particle and that the inorganic particles did not form one or more layers (in the Table shown later, this result is indicated by "NO").

Manufacturing Example 1 of Hydrophobized Inorganic Particles

As the inorganic particles, 100 g of spherical alumina fine particles having an average particle diameter of 260 nm ("AFSP-20" manufactured by Denka Company Limited) were added to 240 g of methanol as the hydrophilic solvent, and the mixture was stirred. Thus, a methanol dispersion of the alumina fine particles was obtained.

Also, 9.2 g of polyoxyethylene alkyl ether phosphoric acid ester as the acidic phosphoric acid ester having no polymerizable functional group (hereinafter also referred to as a "non-polymerizable hydrophobizing agent") and 2.3 g of 2-methacryloyloxyethyl succinate as the at least one polymerizable compound selected from the group consisting of: carboxylic acid having a polymerizable functional group; acidic phosphoric acid ester having a polymerizable functional group; and lactone having a polymerizable functional group (hereinafter also referred to as a "polymerizable hydrophobizing agent") were added to 60 g of methanol and dissolved so as to obtain a hydrophobizing solution. Here, the polyoxyethylene alkyl ether phosphoric acid ester was "plysurf (registered trademark) A208F" (trade name) manufactured by DKS Co., Ltd, which is the acidic phosphoric acid ester expressed by the above general formula (1) in which: X is a substituent made by bonding, to the substituent expressed by the general formula (1-1), a linking group expressed by the formula on the extreme left of the general formula (1-2); $R_1$ represents an alkyl group (octyl group) having a carbon number of 8; t1 represents 1; $R_2$ represents an ethylene group; and l1 represents a value in the range from 2 to 200. Also, the 2-methacryloyloxyethyl succinate was "LIGHT ESTER HO-MS" (trade name) manufactured by KYOEISHA CHEMICAL CO., LTD., which is carboxylic acid expressed by the general formula (3) in which: Z represents a substituent made by bonding, to 1-methyl vinyl group, the linking group expressed by the above general formula (3-4) and further the linking group expressed by the above general formula (3-3); $R_{11}$ and $R_{12}$ each represent an ethylene group; and n3 and p3 each represent 1.

The hydrophobizing solution was added to the methanol dispersion of the alumina fine particles, and the mixture was stirred at room temperature for 24 hours so as to perform the hydrophobic treatment in which the alumina fine particles react with the polyoxyethylene alkyl ether phosphoric acid ester and the 2-methacryloyloxyethyl succinate. Thus, a methanol dispersion of the hydrophobized alumina fine particles was obtained, which was made by treating the surfaces of the alumina fine particles with the polyoxyethylene alkyl ether phosphoric acid ester and the 2-methacryloyloxyethyl succinate.

To this methanol dispersion of the hydrophobized alumina fine particles, 100 g of deionized water was added so as to cause microaggregation of the hydrophobized alumina fine particles. After that, the mixture was subjected to deliquoring by filtration and washed by 1500 g of deionized water. After washing and deliquoring, the thus treated object was dried in a vacuum dryer at 60° C. for 5 hours. Thus, the hydrophobized alumina fine particles were obtained as the hydrophobized inorganic particles.

Manufacturing Example 2 of Hydrophobized Inorganic Particles

The hydrophobized alumina fine particles were obtained as the hydrophobized inorganic particles, which were made by treating the surfaces of the alumina fine particles with the polyoxyethylene alkyl ether phosphoric acid ester and 2-methacryloyloxyethyl caproate acid phosphate. The hydrophobized alumina fine particles were obtained in the same way as Manufacturing Example 1 except for using 2.3 g of 2-methacryloyloxyethyl caproate acid phosphate as the at least one polymerizable compound in place of 2.3 g of 2-methacryloyloxyethyl succinate in Manufacturing Example 1. Here, the 2-methacryloyloxyethyl caproate acid phosphate was "KAYAMER (registered trademark) PM-21" (trade name) manufactured by Nippon Kayaku Co., Ltd, which is acidic phosphoric acid ester expressed by the above general formula (2) in which: a2 and b2 each represent about 1.5; Y represents a substituent made by bonding, to the substituent expressed by the general formula (2-1), the linking group expressed by the general formula (2-5) and further the linking group expressed by the general formula (2-2); $R_5$ represents a 1-methyl vinyl group; q2 and t2 each represent 1; $R_6$ represents an n-pentylene group; l2 represents 1; $R_{18}$ represents an ethylene group; and p2 represents 1.

Manufacturing Example 3 of Hydrophobized Inorganic Particles

The hydrophobized alumina fine particles were obtained as the hydrophobized inorganic particles, which were made by treating the surfaces of the alumina fine particles with the polyoxyethylene alkyl ether phosphoric acid ester and γ-butyrolactone methacrylate. The hydrophobized alumina fine particles were obtained in the same way as Manufacturing Example 1 except for changing the used amount of the polyoxyethylene alkyl ether phosphoric acid ester in Manufacturing Example 1 to 8.05 g and using 3.45 g of γ-butyrolactone methacrylate as the at least one polymerizable compound in place of the 2-methacryloyloxyethyl succinate in Manufacturing Example 1. Here, the γ-butyrolactone methacrylate was "GBLMA" (abbreviated name) manufactured by OSAKA ORGANIC CHEMICAL INDUSTRY LTD., which is lactone expressed by the above general formula (4) in which: $R_{13}$ represents a propane-1,1,3-triyl group whose 1-site is bonded to the carbon atom expressed in the general formula (4); W represents a substituent expressed by the general formula (4-1); $R_{14}$ represents a 1-methyl vinyl group; and q4 and t4 each represent 1.

Manufacturing Example 4 of Hydrophobized Inorganic Particles

The hydrophobized alumina fine particles were obtained as the hydrophobized inorganic particles in the same way as Manufacturing Example 1 except for changing the used amount of the polyoxyethylene alkyl ether phosphoric acid ester in Manufacturing Example 1 to 6.9 g and also changing the used amount of the 2-methacryloyloxyethyl succinate in Manufacturing Example 1 to 4.6 g.

Manufacturing Example 5 of Hydrophobized Inorganic Particles

Hydrophobized aluminum nitride fine particles were obtained as the hydrophobized inorganic particles, which were made by treating the surfaces of the alumina fine particles with the polyoxyethylene alkyl ether phosphoric acid ester and the 2-methacryloyloxyethyl succinate. The hydrophobized aluminum nitride fine particles were obtained in the same way as Manufacturing Example 1 except for using, as the inorganic particles, 100 g of spherical aluminum nitride fine particles ("HF-01" manufactured by Tokuyama Corporation) having an average particle diameter of 1100 nm in place of 100 g of spherical alumina fine particles having an average particle diameter of 260 nm in Manufacturing Example 1.

Manufacturing Example 6 of Hydrophobized Inorganic Particles

The hydrophobized inorganic particles were obtained in the same way as Manufacturing Example 2 except for not using 9.2 g of the polyoxyethylene alkyl ether phosphoric acid ester used in Manufacturing Example 2 and also changing the used amount of the 2-methacryloyloxyethyl caproate acid phosphate as the at least one kind of polymerizable compound in Manufacturing Example 2 to 11.5 g.

Manufacturing Example 7 of Hydrophobized Inorganic Particles

The manufacturing process was performed in the same way as Manufacturing Example 1 except for not using 9.2 g of the polyoxyethylene alkyl ether phosphoric acid ester used in Manufacturing Example 1 and also changing the used amount of the 2-methacryloyloxyethyl succinate in Manufacturing Example 1 to 11.5 g. However, the inorganic particles flowed to the side of the solution at the time of deliquoring by filtration. It means that the hydrophobic treatment could not be sufficiently performed.

Manufacturing Example 8 of Hydrophobized Inorganic Particles

The hydrophobized inorganic particles were obtained in the same way as Manufacturing Example 1 except for not using 2.3 g of 2-methacryloyloxyethyl succinate used in Manufacturing Example 1 and also changing the used amount of the polyoxyethylene alkyl ether phosphoric acid ester in Manufacturing Example 1 to 11.5 g.

Table 1 below indicates respective ingredients and their used amounts in Manufacturing Examples 1 to 8, as well as whether the hydrophobic treatment could be sufficiently performed in Manufacturing Examples to 8 (when the hydrophobic treatment could be sufficiently performed, the term "YES" is indicated, on the other hand, when the hydrophobic treatment could not be sufficiently performed, the term "NO" is indicated).

Example 1

(Preparation of Organic-Inorganic Composite Particles)

The polymerizable mixture was prepared by: mixing 30 g of styrene as the monofunctional vinyl monomer, 4.2 g of divinylbenzene as the polyfunctional vinyl monomer, 0.34 g of dilauroyl peroxide as the polymerization initiator, and 22.8 g of hydrophobized inorganic particles obtained in Manufacturing Example 1; and stirring the mixture. Also, 1.7 g of polyvinyl alcohol (trade name: "Gohsenol (registered trademark) GM-14L," manufactured by The Nippon Synthetic Chemical Industry Co., Ltd.) was dissolved, as the dispersant, in 340 g of deionized water as the aqueous medium so as to make an aqueous phase. The polymerizable mixture was added to the aqueous phase, and dispersed at the stirring speed of 7000 rpm for 5 minutes using a high-speed emulsifying disperser (trade name: "HOMOGENIZING MIXER MARK II MODEL 2.5", manufactured by Primix Corporation), thus, a suspension in an amount of approximately 10 μm was obtained. After that, the obtained suspension was put into a 500 mL separable flask. The internal temperature was increased up to 70° C. and then the suspension was stirred for 5 hours. Thus, the suspension polymerization was completed.

After cooling the suspension, the suspension was dehydorated by filtration so as to separate a solid content, and the solid content was washed by 1 L of warm water. Thus washed solid content was dried at 60° C. for 24 hours, and was passed through a mesh having an aperture of 45 μm so as to remove the particles having a particle diameter more than 45 μm. Thus, organic-inorganic composite particles having a volume average particle diameter of 13.09 μm were obtained. The amount of the inorganic particles contained in the organic-inorganic composite particles, which was obtained based on the ignition residue, was 41.11 wt %.

Figure 2:
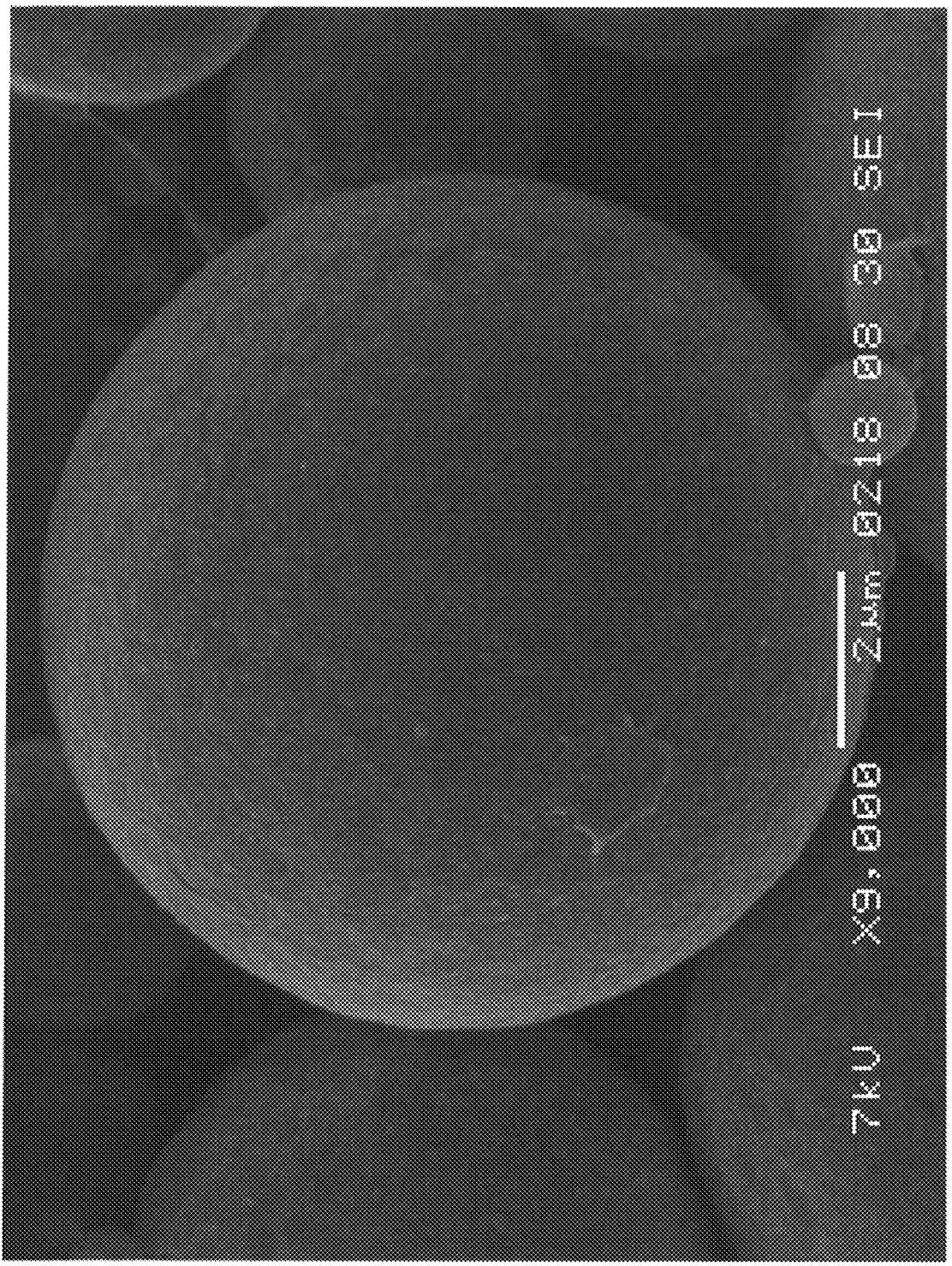
FIG. 2 is a SEM image showing a surface of the organic-inorganic composite particle obtained in Example 1.

FIG. 1 is a scanning electron microscope (SEM) image showing a cross section of the obtained organic-inorganic composite particle. FIG. 2 is a SEM image showing a surface of the obtained organic-inorganic composite particle. The cross-sectional SEM images shown in FIG. 1 and FIGS. 3, 5, 7 and 13 (described later) are backscattered electron images, and white parts in the Figures correspond

TABLE 1

Figure 9:
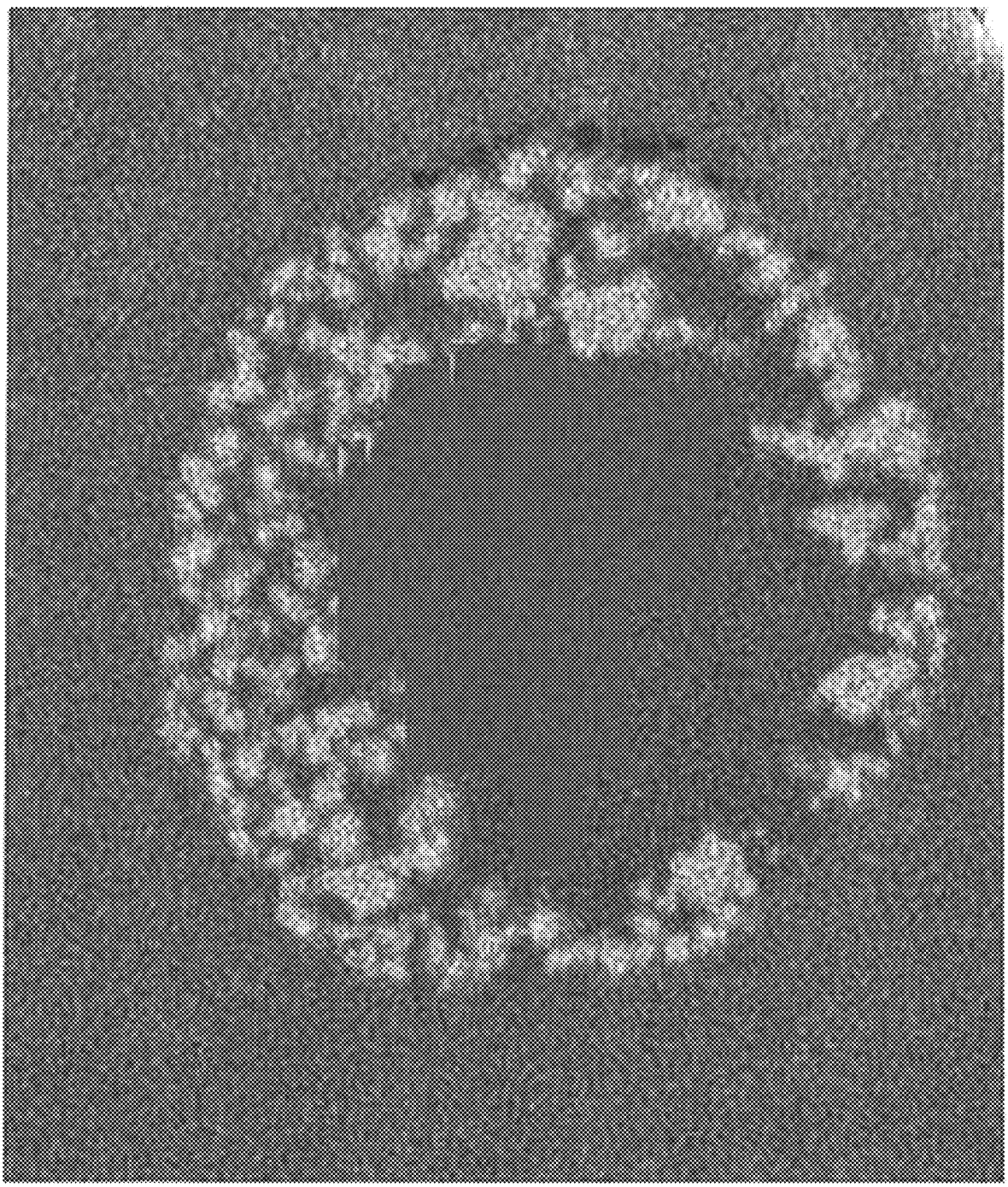
FIG. 9 is a SEM image showing a cross section of an organic-inorganic composite particle obtained in Example 5.
Figure 11:
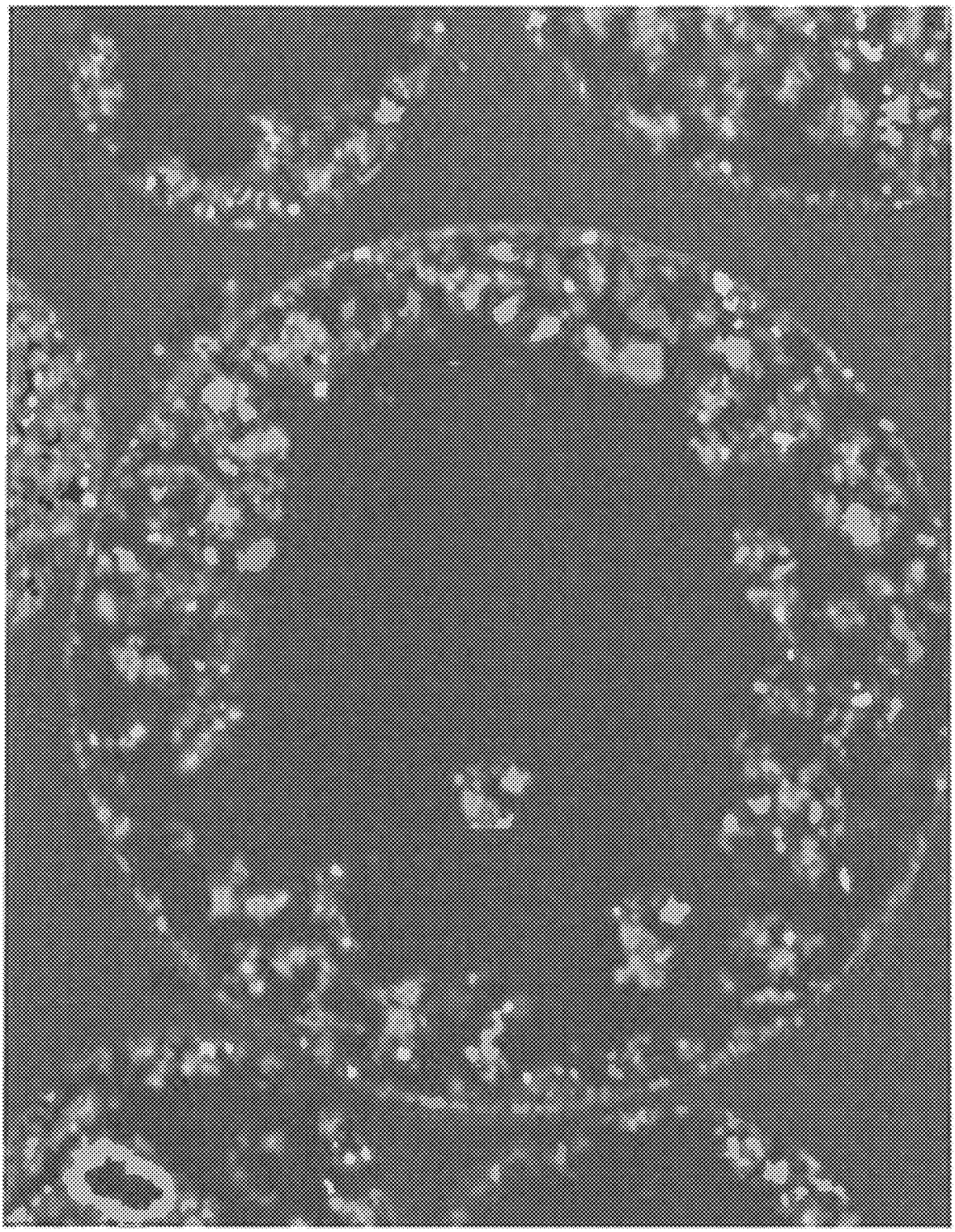
FIG. 11 is a SEM image showing a cross section of an organic-inorganic composite particle obtained in Example 6.

| | | Manufacturing Example 1 | Manufacturing Example 2 | Manufacturing Example 3 | Manufacturing Example 4 | Manufacturing Example 5 | Manufacturing Example 6 | Manufacturing Example 7 | Manufacturing Example 8 |
|---|---|---|---|---|---|---|---|---|---|
| Inorganic particles | Alumina fine particles (g) | 100 | 100 | 100 | 100 | — | 100 | 100 | 100 |
| | Aluminum nitride fine particles (g) | — | — | — | — | 100 | — | — | — |
| Non-polymerizable hydrophobizing agent | Polyoxyethylene alkyl ether phosphoric acid ester (g) | 9.2 | 9.2 | 8.05 | 6.9 | 9.2 | — | — | 11.5 |
| Polymerizable hydrophobizing agent | 2-methacryloyloxyethyl succinate (g) | 2.3 | — | — | 4.6 | 2.3 | — | 11.5 | — |
| | γ-butyrolactone methacrylate (g) | — | — | 3.45 | — | — | — | — | — |
| | 2-methacryloyloxyethyl caproate acid phosphate (g) | — | 2.3 | — | — | — | 11.5 | — | — |
| Hydrophilic solvent | Methanol (g) | 300 | 300 | 300 | 300 | 300 | 300 | 300 | 300 |
| Sufficient hydrophobic treatment | | YES | YES | YES | YES | YES | YES | NO | YES | to the inorganic particles (i.e. the alumina fine particles in FIGS. 1, 3, 5, 7 and 13, the aluminum nitride fine particles in FIG. 9, and the alumina fine particles and aluminum nitride fine particles in FIG. 11). It was confirmed, from FIG. 1, that the alumina fine particles were unevenly located on the surface layer of the obtained organic-inorganic composite particle so as to form one or more layers.

(Preparation of Thermally Conductive Resin Composition)

As an ingredient of the epoxy resin as the matrix resin, 0.612 g of 1,6-bis(2,3-epoxypropane-1-yloxy) naphthalene (trade name: "EPICLON (registered trademark) HP-4032D", manufactured by DIC Corporation) was dissolved in 2 g of ethyl acetate as the solvent so as to obtain a solution. To this solution, 1.32 g of the organic-inorganic composite particles obtained in Example 1 and 0.07 g of 1-benzyl-2-methylimidazole (trade name: "CUREZOL (registered trademark) 1B2MZ", manufactured by SHIKOKU CHEMICALS CORPORATION) as the curing agent were added and the mixture was stirred by a stirrer. After that, the solvent was completely volatilized so as to obtain a precursor of the thermally conductive resin composition. Then, a mold with a hole having a diameter of 10 mm and a thickness of 2 mm was filled with 0.25 g of thus obtained precursor so as to perform thermal compression molding using a heat press machine for 30 minutes under the condition of the temperature of 120° C. and the pressure of 1 MPa. Thus, pellets of the cured thermally conductive resin composition were obtained.

The thermal conductivity of the obtained pellets of the thermally conductive resin composition was measured, and an obtained value was 0.36 W/(m·K).

Example 2

The organic-inorganic composite particles were prepared in the same way as Example 1 except for using the hydrophobized inorganic particles obtained in Manufacturing Example 2 in place of the hydrophobized inorganic particles obtained in Manufacturing Example 1.

Figure 3:
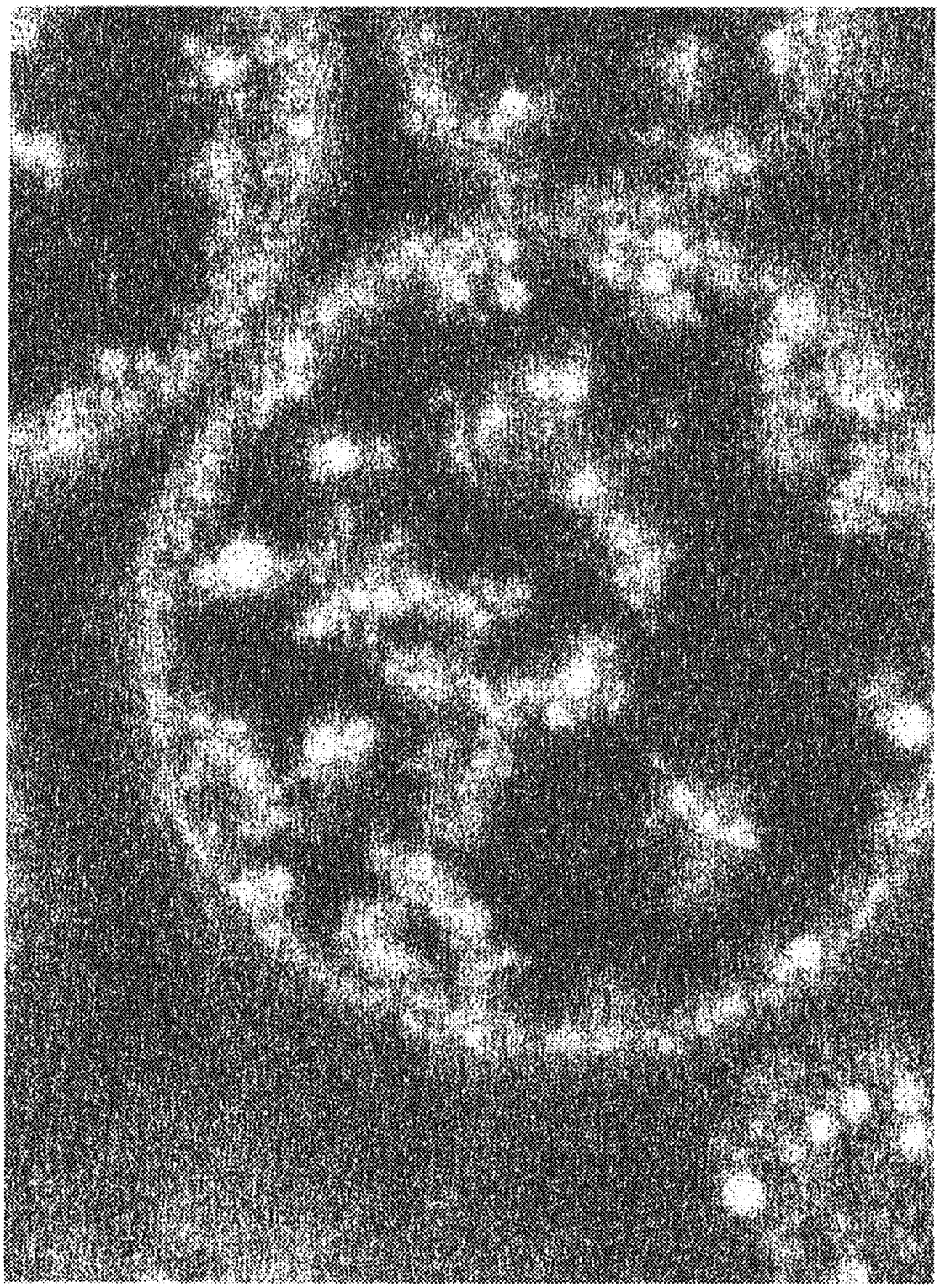
FIG. 3 is a SEM image showing a cross section of an organic-inorganic composite particle obtained in Example 2.
Figure 4:
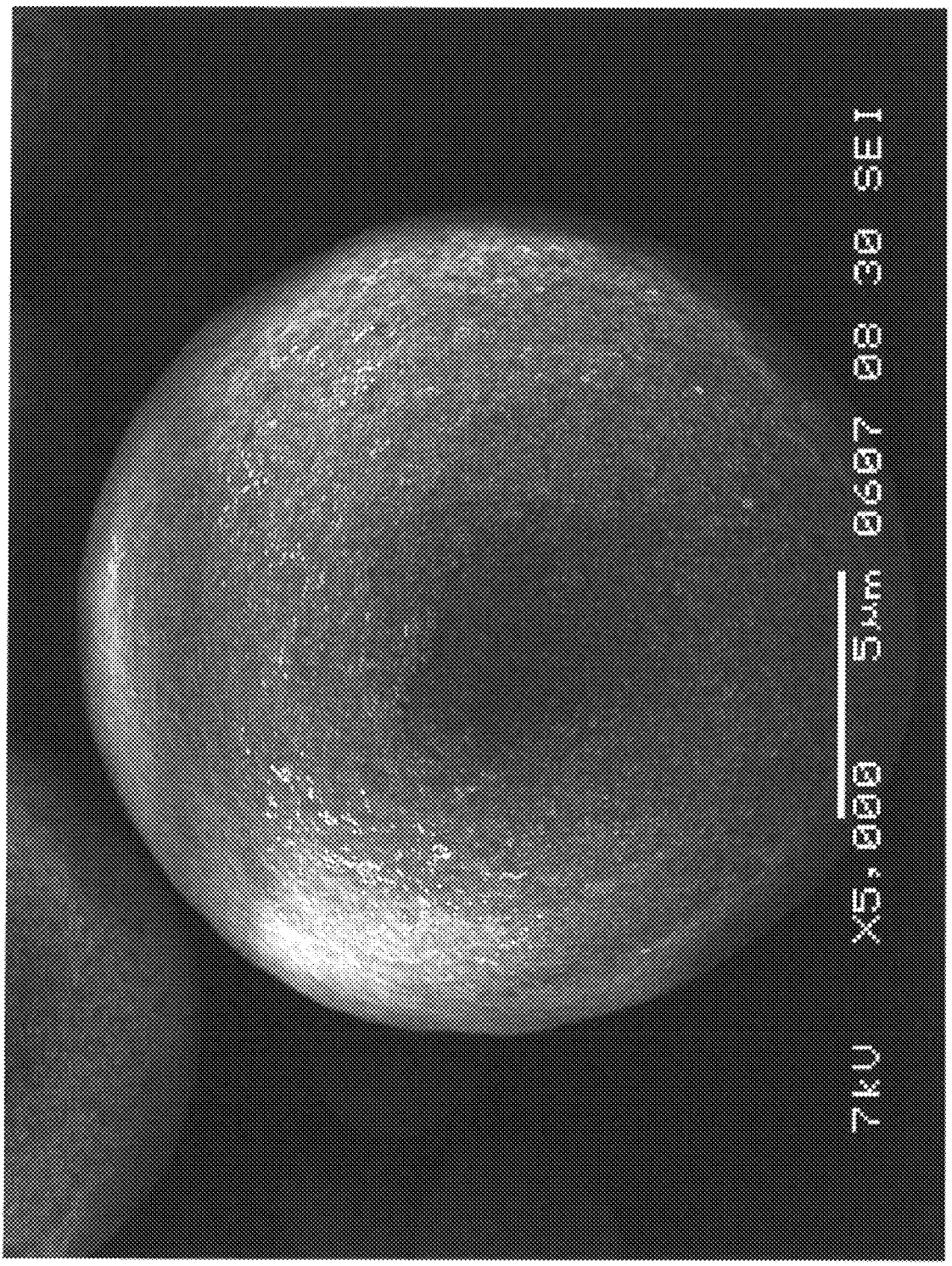
FIG. 4 is a SEM image showing a surface of the organic-inorganic composite particle obtained in Example 2.

The obtained organic-inorganic composite particle had a volume average particle diameter of 11.28 μm and contained 42.96 wt % inorganic particles. FIG. 3 is a SEM image showing a cross section of the obtained organic-inorganic composite particle. FIG. 4 is a SEM image showing a surface of the obtained organic-inorganic composite particle. It was confirmed, from FIG. 3, that the alumina fine particles were unevenly located on the surface layer of the obtained organic-inorganic composite particle so as to form one or more layers.

Also, the thermally conductive resin composition was prepared in the same way as Example 1 except for using the organic-inorganic composite particles obtained in this Example in place of the organic-inorganic composite particles obtained in Example 1. The thermal conductivity of the obtained thermally conductive resin composition was measured, and an obtained value was 0.35 W/(m·K).

Example 3

The organic-inorganic composite particles were prepared in the same way as Example 1 except for using the hydrophobized inorganic particles obtained in Manufacturing Example 3 in place of the hydrophobized inorganic particles obtained in Manufacturing Example 1.

Figure 5:
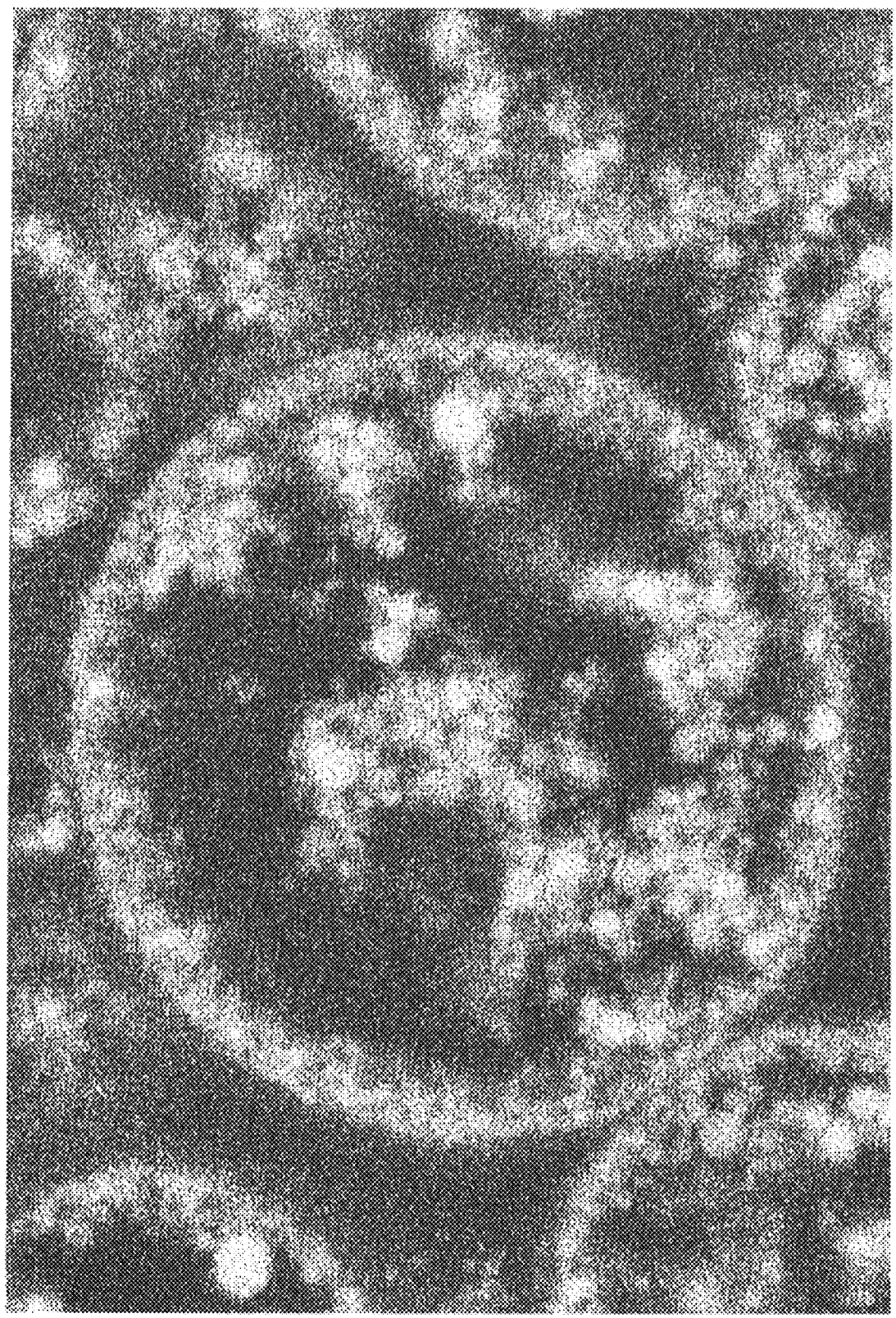
FIG. 5 is a SEM image showing a cross section of an organic-inorganic composite particle obtained in Example 3.
Figure 6:
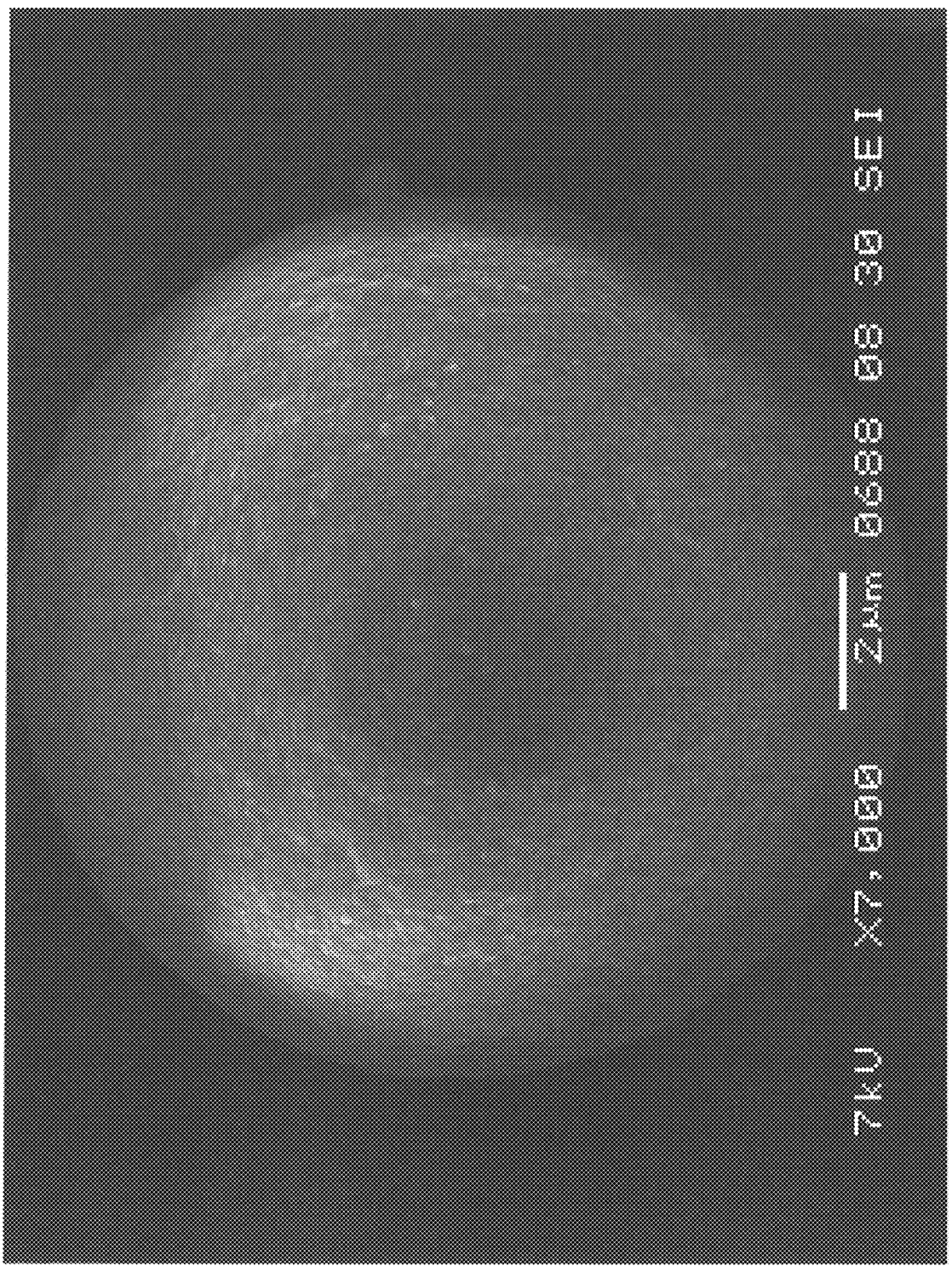
FIG. 6 is a SEM image showing a surface of the organic-inorganic composite particle obtained in Example 3.

The obtained organic-inorganic composite particle had a volume average particle diameter of 12.23 μm and contained 41.23 wt % inorganic particles. FIG. 5 is a SEM image showing a cross section of the obtained organic-inorganic composite particle. FIG. 6 is a SEM image showing a surface of the obtained organic-inorganic composite particle. It was confirmed, from FIG. 5, that the alumina fine particles were unevenly located on the surface layer of the obtained organic-inorganic composite particle so as to form one or more layers.

Also, the thermally conductive resin composition was prepared in the same way as Example 1 except for using the organic-inorganic composite particles obtained in this Example in place of the organic-inorganic composite particles obtained in Example 1. The thermal conductivity of the obtained thermally conductive resin composition was measured, and an obtained value was 0.33 W/(m·K).

Example 4

The organic-inorganic composite particles were prepared in the same way as Example 1 except for using the hydrophobized inorganic particles obtained in Manufacturing Example 4 in place of the hydrophobized inorganic particles obtained in Manufacturing Example 1.

Figure 7:
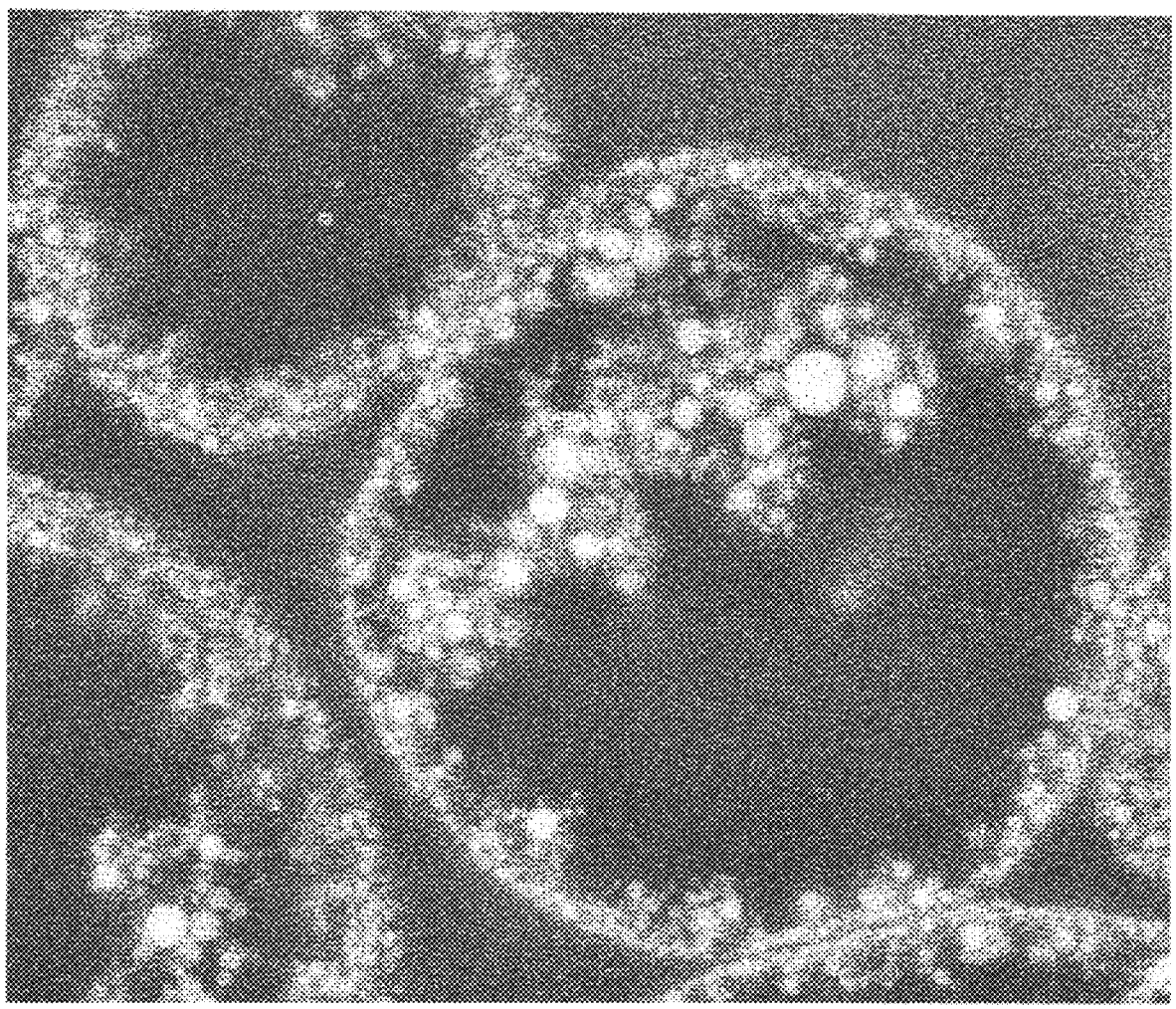
FIG. 7 is a SEM image showing a cross section of an organic-inorganic composite particle obtained in Example 4.
Figure 8:
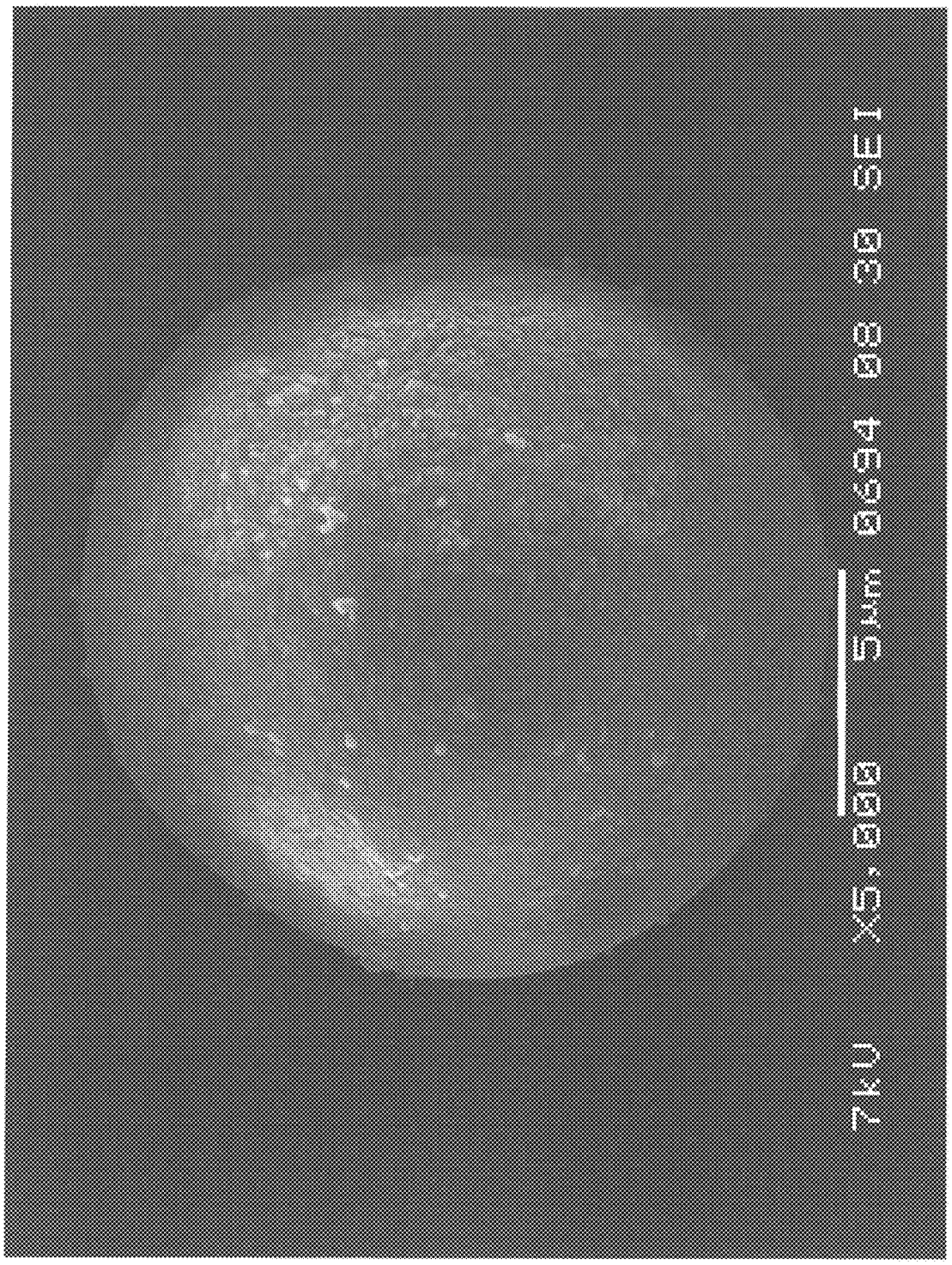
FIG. 8 is a SEM image showing a surface of the organic-inorganic composite particle obtained in Example 4.

The obtained organic-inorganic composite particle had a volume average particle diameter of 11.56 μm and contained 42.51 wt % inorganic particles. FIG. 7 is a SEM image showing a cross section of the obtained organic-inorganic composite particle. FIG. 8 is a SEM image showing a surface of the obtained organic-inorganic composite particle. It was confirmed, from FIG. 7, that the alumina fine particles were unevenly located on the surface layer of the obtained organic-inorganic composite particle so as to form one or more layers.

Also, the thermally conductive resin composition was prepared in the same way as Example 1 except for using the organic-inorganic composite particles obtained in this Example in place of the organic-inorganic composite particles obtained in Example 1. The thermal conductivity of the obtained thermally conductive resin composition was measured, and an obtained value was 0.35 W/(m·K).

Example 51

The organic-inorganic composite particles were prepared in the same way as Example 1 except for: changing the used amount of styrene and the used amount of divinylbenzene in Example 1 to, respectively, 27.6 g and 3.8 g; and using 25.6 g of hydrophobized inorganic particles obtained in Manufacturing Example 5 in place of 22.8 g of hydrophobized inorganic particles obtained in Manufacturing Example 1.

Figure 10:
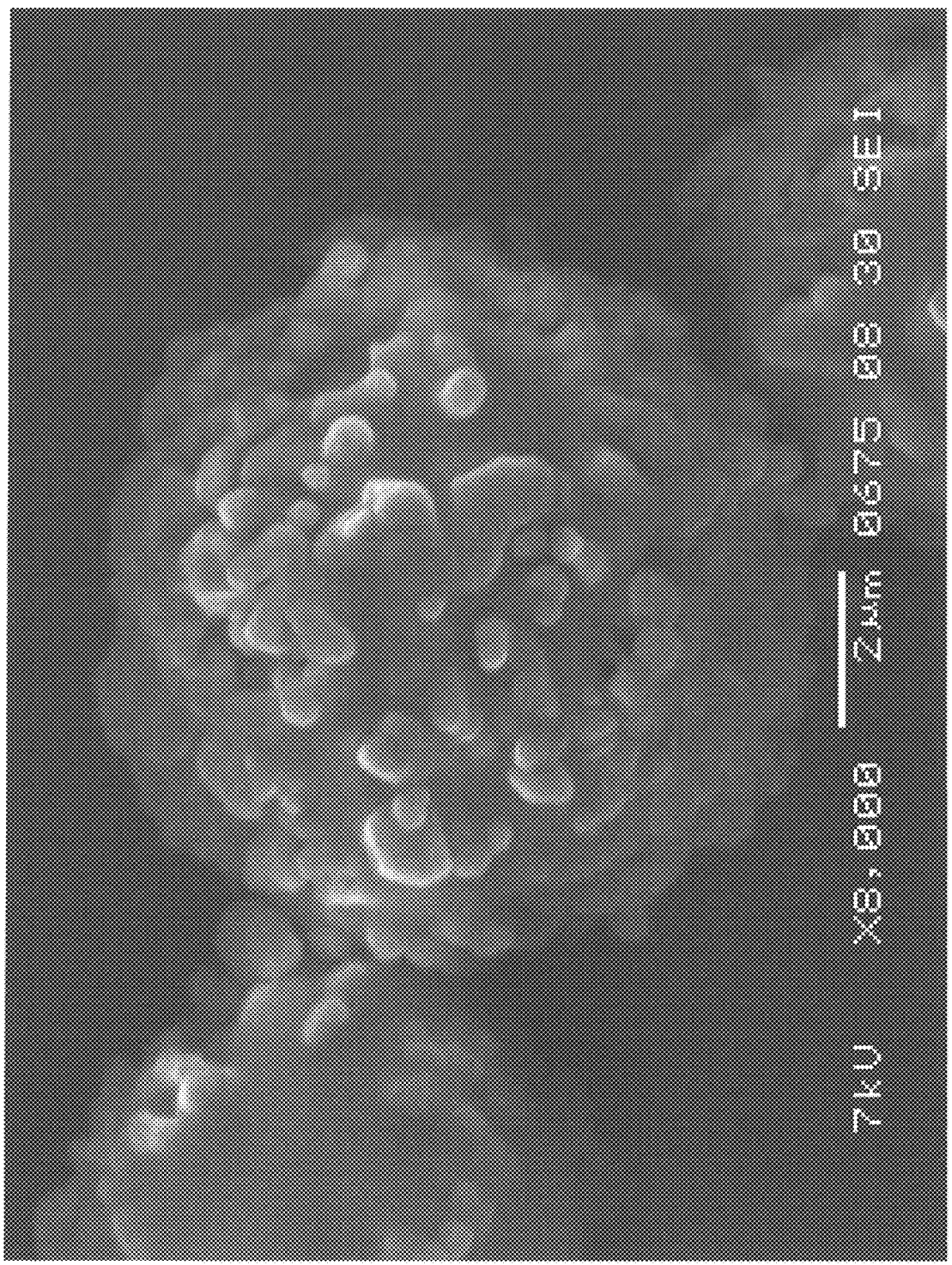
FIG. 10 is a SEM image showing a surface of the organic-inorganic composite particle obtained in Example 5.

The obtained organic-inorganic composite particle had a volume average particle diameter of 14.35 μm and contained 46.22 wt % inorganic particles. FIG. 9 is a SEM image showing a cross section of the obtained organic-inorganic composite particle. FIG. 10 is a SEM image showing a surface of the obtained organic-inorganic composite particle. It was confirmed, from FIG. 9, that the aluminum nitride fine particles were unevenly located on the surface layer of the obtained organic-inorganic composite particle so as to form one or more layers.

Also, the thermally conductive resin composition was prepared in the same way as Example 1 except for using the organic-inorganic composite particles obtained in this Example in place of the organic-inorganic composite particles obtained in Example 1. The thermal conductivity of the obtained thermally conductive resin composition was measured, and an obtained value was 0.41 W/(m·K).

Example 6

The organic-inorganic composite particles were prepared in the same way as Example 5 except for: changing the used amount of the hydrophobized inorganic particle obtained in Manufacturing Example 5 to 14.2 g; and adding 11.4 g of hydrophobized inorganic particles obtained in Manufacturing Example 1.

Figure 12:
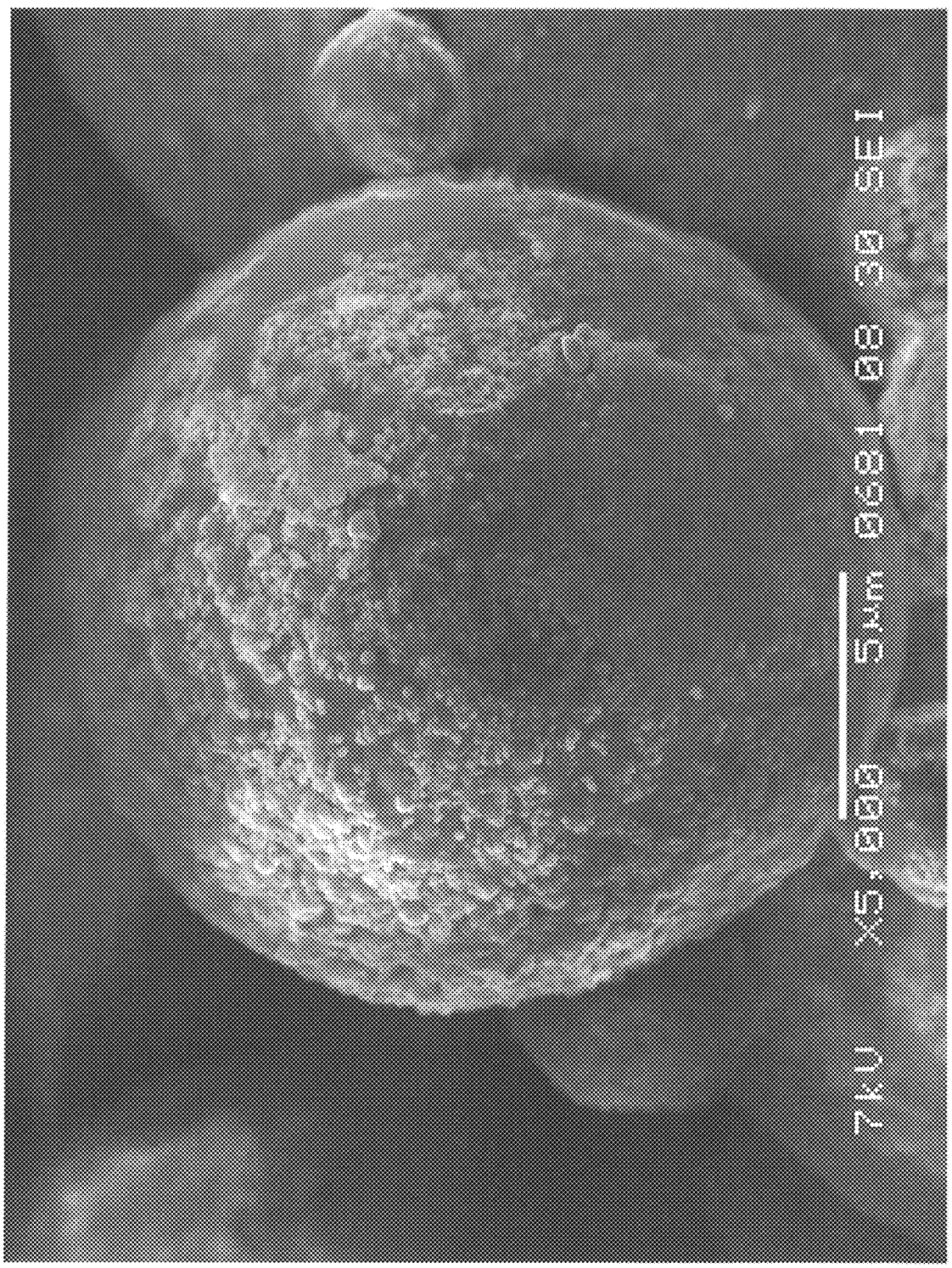
FIG. 12 is a SEM image showing a surface of the organic-inorganic composite particle obtained in Example 6.

The obtained organic-inorganic composite particle had a volume average particle diameter of 14.21 μm and contained 44.55 wt % inorganic particles. FIG. 11 is a SEM image showing a cross section of the obtained organic-inorganic composite particle. FIG. 12 is a SEM image showing a surface of the obtained organic-inorganic composite particle. It was confirmed, from FIG. 11, that the inorganic particles (alumina fine particles and aluminum nitride fine particles) were unevenly located on the surface layer of the obtained organic-inorganic composite particle so as to form one or more layers.

Also, the thermally conductive resin composition was prepared in the same way as Example 1 except for using the organic-inorganic composite particles obtained in this Example in place of the organic-inorganic composite particles obtained in Example 1. The thermal conductivity of the obtained thermally conductive resin composition was measured, and an obtained value was 0.34 W/(m·K).

Comparative Example 1

The organic-inorganic composite particles were prepared in the same way as Example 1 except for using the hydrophobized inorganic particles obtained in Manufacturing Example 6 in place of the hydrophobized inorganic particles obtained in Manufacturing Example 1.

Figure 13:
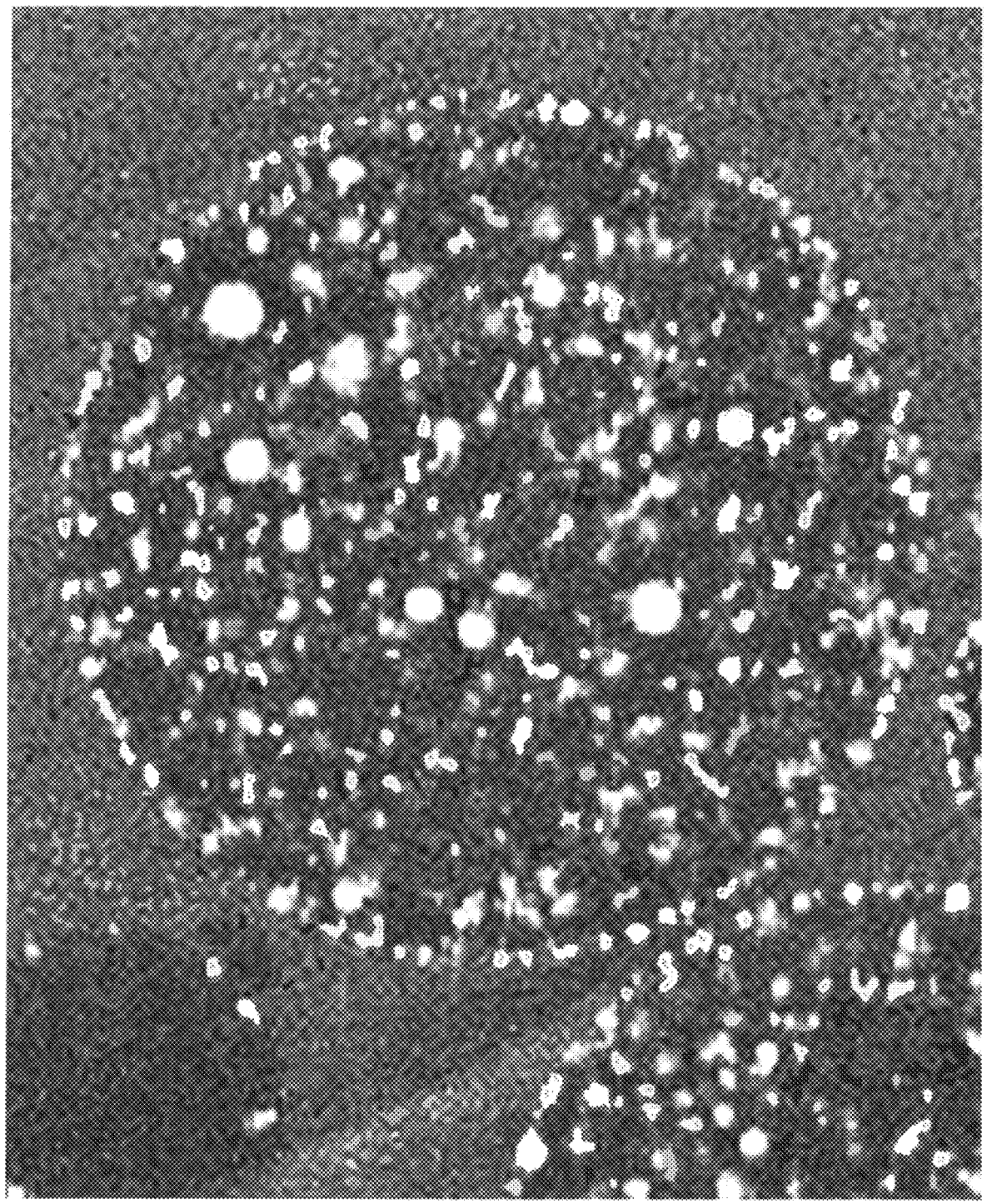
FIG. 13 is a SEM image showing a cross section of an organic-inorganic composite particle obtained in Comparative Example 1.
Figure 14:
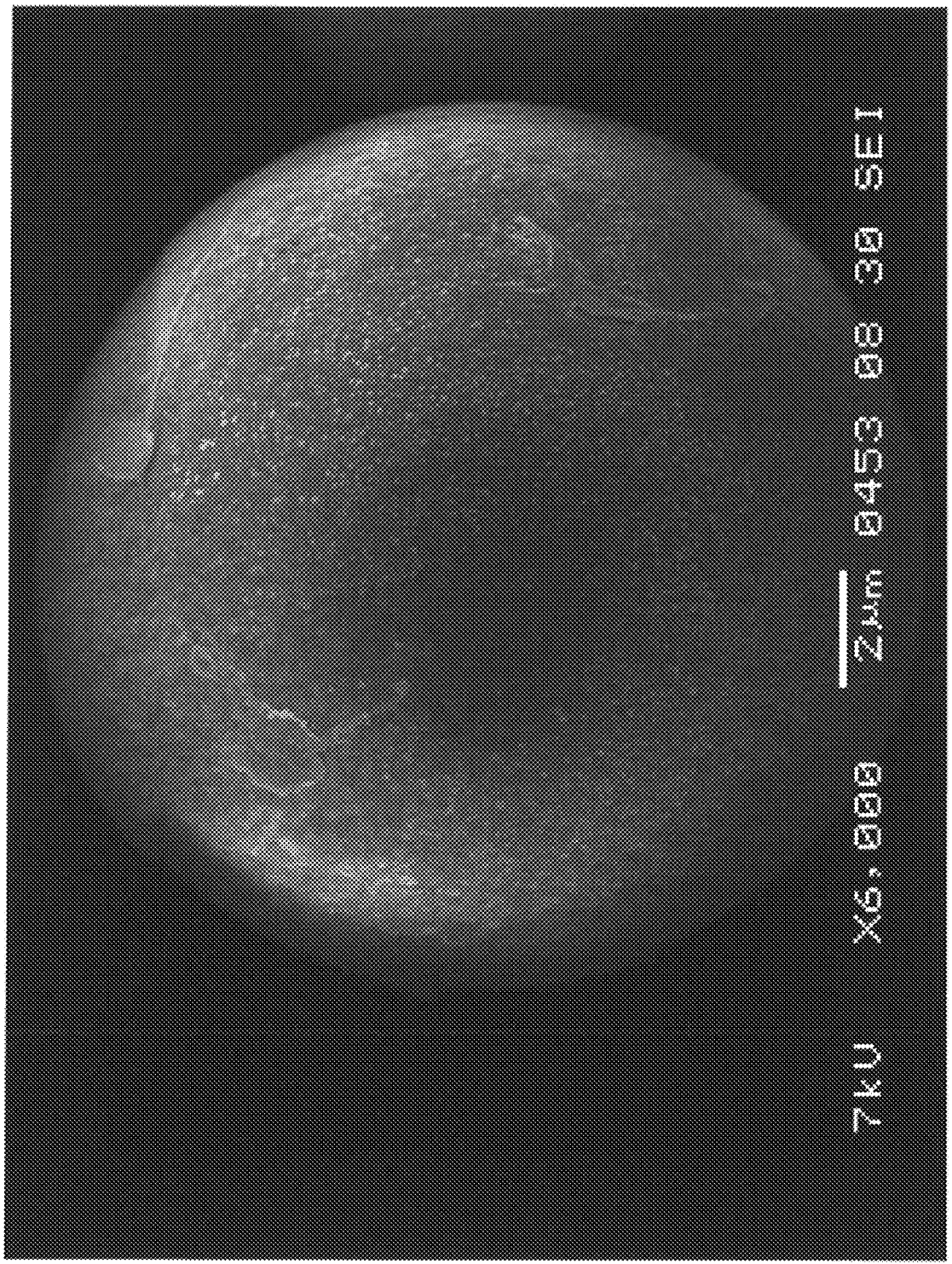
FIG. 14 is a SEM image showing a surface of the organic-inorganic composite particle obtained in Comparative Example 1.

The obtained organic-inorganic composite particle had a volume average particle diameter of 12.48 μm and contained 41.37 wt % inorganic particles. FIG. 13 is a SEM image showing a cross section of the obtained organic-inorganic composite particle. FIG. 14 is a SEM image showing a surface of the obtained organic-inorganic composite particle. It was confirmed, from FIG. 13, that the inorganic particles (alumina fine particles) were evenly dispersed in the obtained organic-inorganic composite particle and that the inorganic particles were not unevenly located on the surface layer of the organic-inorganic composite particle, which resulted in less than one layer of the inorganic particles being formed.

Also, the thermally conductive resin composition was prepared in the same way as Example 1 except for using the organic-inorganic composite particles obtained in this Comparative Example in place of the organic-inorganic composite particles obtained in Example 1. The thermal conductivity of the obtained thermally conductive resin composition was measured, and an obtained value was 0.26 W/(m·K).

Comparative Example 2

The organic-inorganic composite particles were prepared in the same way as Example 1 except for using the hydrophobized inorganic particles obtained in Manufacturing Example 8 in place of the hydrophobized inorganic particles obtained in Manufacturing Example 1.

Figure 15:
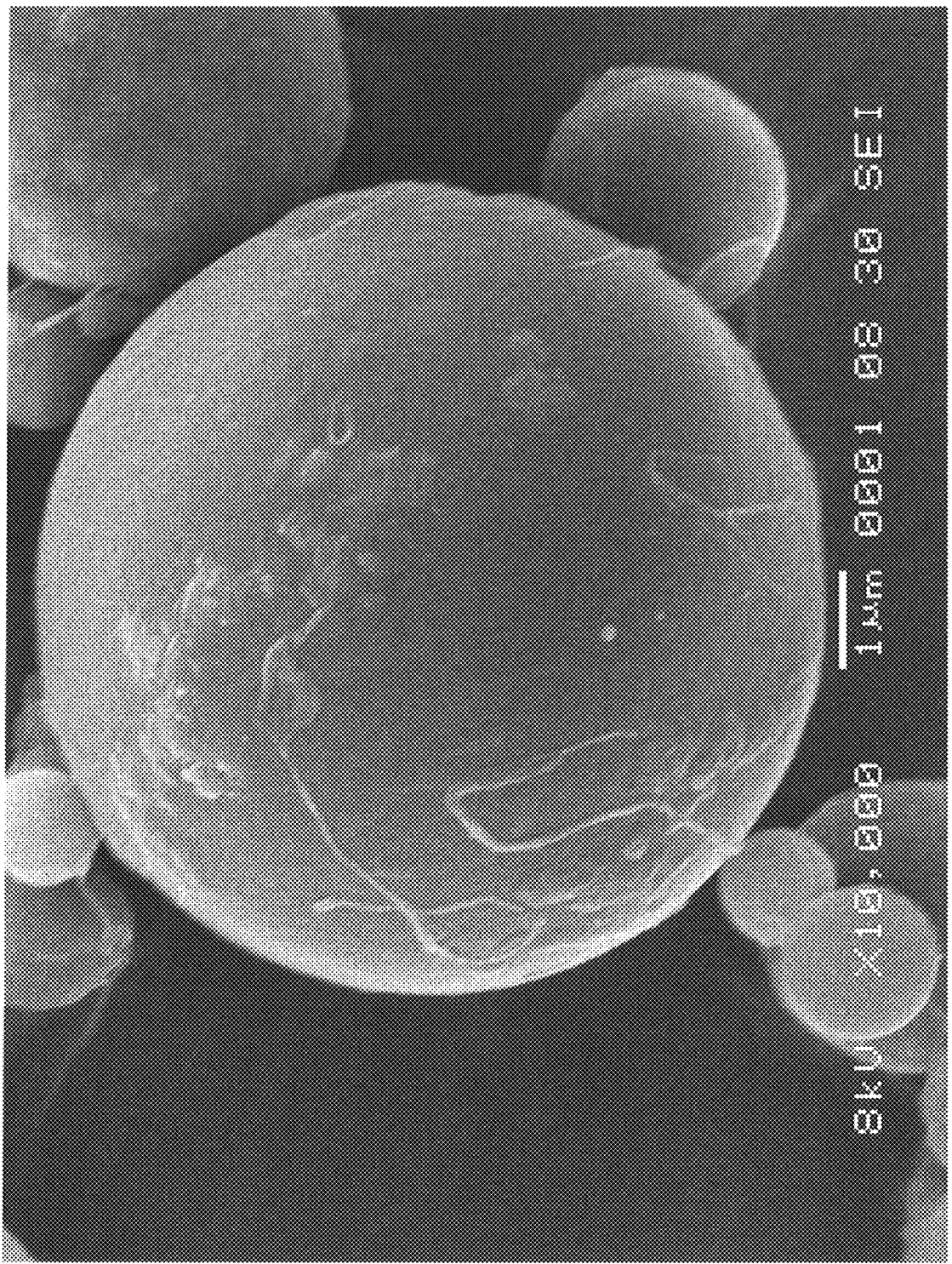
FIG. 15 is a SEM image showing a surface of an organic-inorganic composite particle obtained in Comparative Example 2.

The obtained organic-inorganic composite particle had a volume average particle diameter of 11.21 μm and contained 3.52 wt % inorganic particles. FIG. 15 is a SEM image showing a surface of the obtained organic-inorganic composite particle. From the surface SEM image of the obtained organic-inorganic composite particle, the inorganic particles (alumina fine particles) could not be confirmed on the surface layer of the organic-inorganic composite particle. The hydrophobized inorganic particles obtained in Manufacturing Example 8 were made by the inorganic particles subjected to the surface treatment only by the polyoxyethylene alkyl ether phosphoric acid ester. Thus, since the hydrophobized inorganic particles had no polymerizable functional group, they could not be covalently bonded to the vinyl polymer, and in the result, a large number of hydrophobized inorganic particles were considered to fall off.

Also, the thermally conductive resin composition was prepared in the same way as Example 1 except for using the organic-inorganic composite particles obtained in this Comparative Example in place of the organic-inorganic composite particles obtained in Example 1. The thermal conductivity of the obtained thermally conductive resin composition was measured, and an obtained value was 0.24 W/(m·K).

Comparative Example 3

Figure 16:
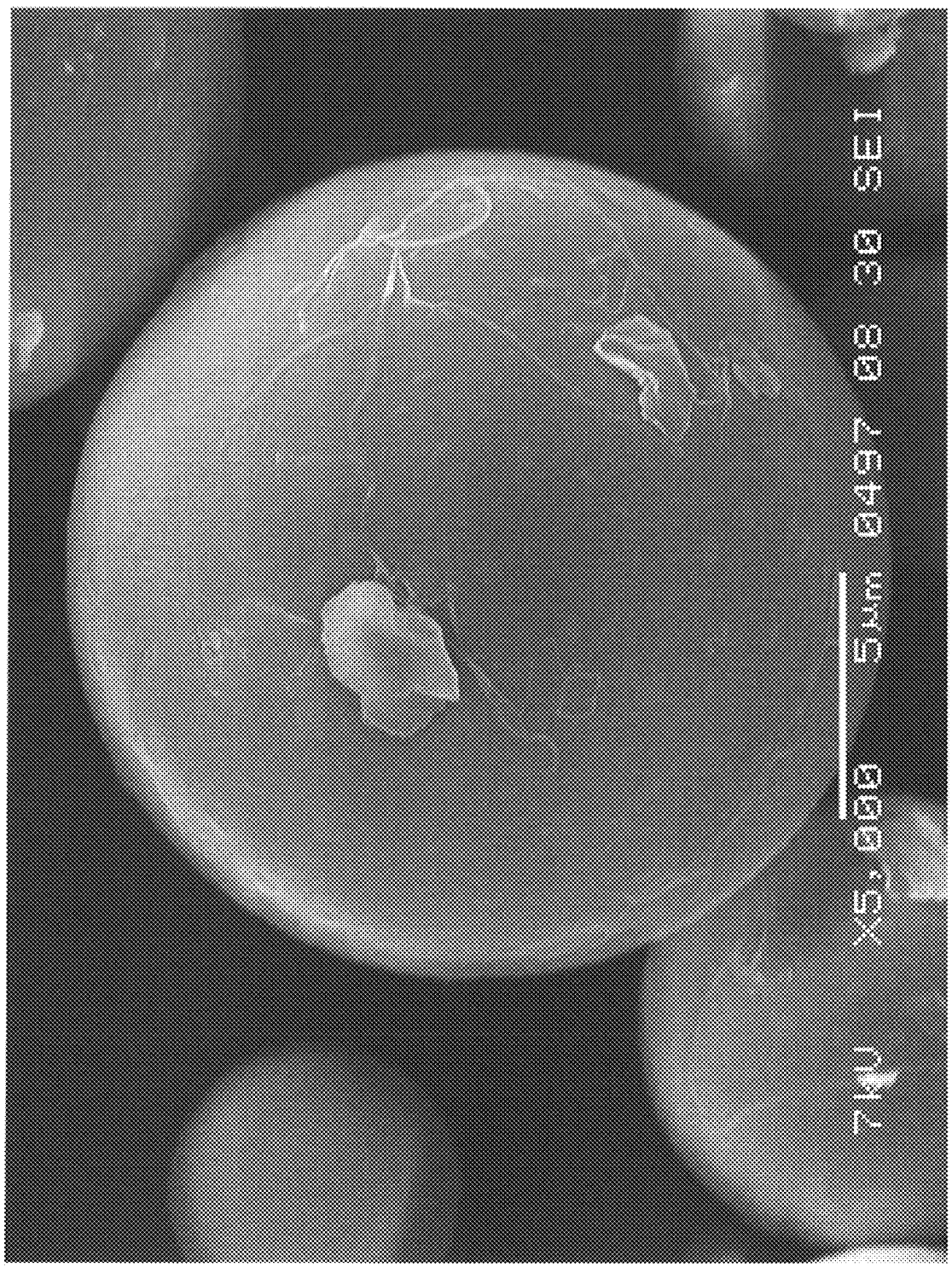
FIG. 16 is a SEM image showing a surface of a resin particle obtained in Comparative Example 3.

Resin particles were prepared in the same way as Example 1 except for: changing the used amount of styrene, the used amount of divinylbenzene, and the used amount of dilauroyl peroxide in Example 1 to, respectively, 50 g, 7.0 g, and 0.57 g; and not adding the hydrophobized inorganic particles in Example 1. The obtained resin particle had a volume average particle diameter of 10.23 μm. FIG. 16 is a SEM image showing a surface of the obtained resin particle.

Also, the thermally conductive resin composition was prepared in the same way as Example 1 except for using the resin particles obtained in this Comparative Example in place of the organic-inorganic composite particles obtained in Example 1. The thermal conductivity of the obtained thermally conductive resin composition was measured, and an obtained value was 0.21 W/(m·K).

Table 2 below indicates: respective ingredients and their used amounts in Examples 1 to 6 and Comparative Examples 1 to 3; (i) the volume average particle diameters, (ii) the content of the inorganic particles, and (iii) the measurement results of the number of layers of the inorganic particles unevenly located on the surface layers, of the respectively obtained organic-inorganic composite particles in Examples 1 to 6 and Comparative Examples 1 to 3; determination results of whether the inorganic particles were unevenly located on the surface layers of the organic-inorganic composite particles obtained in Examples 1 to 6 and Comparative Examples 1 to 3 so that the inorganic particles formed one or more layers; and the measurement results of the thermal conductivities of the thermally conductive resin compositions in which the organic-inorganic composite particles obtained in Examples 1 to 6 and Comparative Examples 1 to 3 were respectively used.

TABLE 2

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Oil phase | Manufacturing example No. of used inorganic particles and used amount thereof (g) | 1 (22.8) | 2 (22.8) | 3 (22.8) | 4 (22.8) | 5 (25.6) | 1 (11.4) + 5 (14.2) | 6 (22.8) | 8 (22.8) | Not added |
|  | Polymerizable vinyl monomer — Styrene (g) | 30 | 30 | 30 | 30 | 27.6 | 27.6 | 30 | 30 | 50 |
|  | Polymerizable vinyl monomer — Divinylbenzene (g) | 4.2 | 4.2 | 4.2 | 4.2 | 3.8 | 3.8 | 4.2 | 4.2 | 7.0 |
|  | Polymerization initiator — Dilauroyl peroxide (g) | 0.34 | 0.34 | 0.34 | 0.34 | 0.34 | 0.34 | 0.34 | 0.34 | 0.57 |
| Aqueous phase | Aqueous medium — Deionized water (g) | 340 | 340 | 340 | 340 | 340 | 340 | 340 | 340 | 340 |
|  | Dispersant — Polyvinyl alcohol (g) | 1.7 | 1.7 | 1.7 | 1.7 | 1.7 | 1.7 | 1.7 | 1.7 | 1.7 |
| Measurement results of organic-inorganic composite particle | Volume average particle diameter (μm) | 13.09 | 11.28 | 12.23 | 11.56 | 14.35 | 14.21 | 12.48 | 11.21 | 10.23 |
|  | Content of inorganic particles (wt %) | 41.11 | 42.96 | 41.23 | 42.51 | 46.22 | 44.55 | 41.37 | 3.52 | — |
|  | Number of layers of inorganic particles unevenly located on surface layer | 2.24 | 2.23 | 2.59 | 2.47 | 1.26 | 1.30 | 0.46 | 0.11 | — |
|  | Inorganic particles unevenly located on surface layer to form one or more layers | YES | YES | YES | YES | YES | YES | NO | NO | — |
| Thermal conductivity of thermally conductive resin composition (W/(m·K)) |  | 0.36 | 0.35 | 0.33 | 0.35 | 0.41 | 0.34 | 0.26 | 0.24 | 0.21 |

As can be seen from the above, in Comparative Example 1 in which only the polymerizable hydrophobizing agent (i.e. at least one polymerizable compound selected from the group consisting of: carboxylic acid having a polymerizable functional group; acidic phosphoric acid ester having a polymerizable functional group; and lactone having a polymerizable functional group) was used as the hydrophobizing agent, the inorganic particles were evenly dispersed in the organic-inorganic composite particle. Thus, it was not possible to obtain the organic-inorganic composite particle, on the surface layer of which the inorganic particles were unevenly located so as to form one or more layers. Also, in Comparative Example 2 in which only the non-polymerizable hydrophobizing agent (i.e. acidic phosphoric acid ester having no polymerizable functional group) was used as the hydrophobizing agent, a large number of hydrophobized inorganic particles fell off. Thus, it was not possible to obtain the organic-inorganic composite particle, on the surface layer of which the inorganic particles were unevenly located so as to form one or more layers. In contrast, in Examples 1 to 6 in which both the non-polymerizable hydrophobizing agent and the polymerizable hydrophobizing agent were used as the hydrophobizing agent, the organic-inorganic composite particle could be obtained, on the surface layer of which the inorganic particles were unevenly located so as to form one or more layers.

Also, as can be seen from the above, in the organic-inorganic composite particles in Examples 1 to 6, the inorganic particles were unevenly located on the surface layers so as to form one or more layers. Thus, the organic-inorganic composite particles could give, to the thermally conductive resin composition, high thermal conductivity when the organic-inorganic composite particles were mixed as the thermally conductive filler with the matrix resin, compared to the organic-inorganic composite particles in Comparative Examples 1 and 2 (i.e. the organic-inorganic composite particles on the surface layers of which the inorganic particles were unevenly located so as to form less than one layer) and to the resin particles in Comparative Example 3.

The invention claimed is:

1. Organic-inorganic composite particles comprising: a vinyl polymer that is a polymer of a polymerizable vinyl monomer; and inorganic particles including at least one of inorganic oxide and inorganic nitride, wherein
    a thermal conductivity of the inorganic particles is 10 W/(m·K) or more,
        the inorganic particles are subjected to a surface treatment by acidic phosphoric acid ester having no polymerizable functional group, and by at least one polymerizable compound selected from the group consisting of: carboxylic acid having a polymerizable functional group; acidic phosphoric acid ester having a polymerizable functional group; and lactone having a polymerizable functional group,
        the at least one polymerizable compound is bonded to the vinyl polymer, and
        the inorganic particles are unevenly located on surface layers of the organic-inorganic composite particles so that the inorganic particles form one or more layers.

2. The organic-inorganic composite particles according to claim 1, wherein the acidic phosphoric acid ester having no polymerizable functional group is expressed by a general formula (1):

(1)

wherein one of a1 and b1 represents 1 while the other of a1 and b1 represents 2, and X represents a substituent expressed by a general formula (1-1) below, or a substituent made by bonding, to the substituent expressed by the general formula (1-1), at least one linking group selected from linking groups expressed by the general formulae (1-2) below, the linking groups expressed by the general formulae (1-2) being bonded to a phosphorus atom in the above general formula (1) on an oxygen atom side directly or via another linking group:

 (1-1)

wherein $R_1$ represents a C1-C50 linear or branched saturated hydrocarbon group or a C6-C100 aromatic ring-containing hydrocarbon group, and t1 represents 0 or 1; and (1-2)

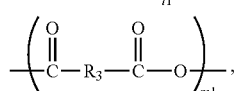

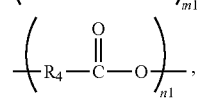

wherein $R_2$, $R_3$, and $R_4$ each represent either a C1-C18 divalent aliphatic hydrocarbon group that may be substituted with an ether bond-containing group or a C6-C30 divalent aromatic ring-containing hydrocarbon group that may be substituted with an ether bond-containing group, and l1, m1 and n1 each represent an integer molar ratio to 1 mole of the substituent expressed by the above general formula (1-1), wherein, l1, m1 and n1 meet the following expressions: l1+m1+n1≤200; 1≤l1≤200; 1≤m1≤200; and 1≤n1≤200, and the at least one polymerizable compound is selected from the group consisting of: acidic phosphoric acid ester expressed by a general formula (2) below; carboxylic acid expressed by a general formula (3) below; and lactone expressed by a general formula (4) below:

 (2)

wherein one of a2 and b2 represents 1 while the other of a1 and b1 represents 2, and Y represents a substituent expressed by a general formula (2-1) below, or a substituent made by bonding, to the substituent expressed by the general formula (2-1), at least one linking group selected from linking groups expressed by general formulae (2-2) to (2-5) below, the linking groups expressed by the general formulae (2-2) to (2-5) being bonded to a phosphorus atom in the above general formula (2) on a side indicated by reference sign "*" directly or via another linking group:

 (2-1)

wherein $R_5$ represents a C1-C18 linear or branched alkeny group, and q2 and t2 independently represent 0 or 1, and

 (2-2)

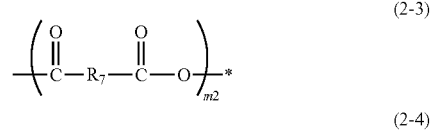 (2-3)

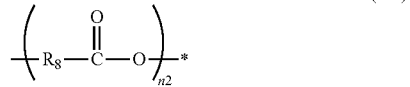 (2-4)

(2-5)

wherein $R_6$, $R_7$, $R_8$, and $R_{18}$ each represent either a C1-C18 divalent aliphatic hydrocarbon group that may be substituted with an ether bond-containing group or a C6-C30 divalent aromatic ring-containing hydrocarbon group that may be substituted with an ether bond-containing group, and l2, m2, n2 and p2 each represent an integer molar ratio to 1 mole of the substituent expressed by the above general formula (2-1), wherein, l2, m2, n2 and p2 meet the following expressions: l2+m2+n2+p2≤200; 1≤l2≤200; 1≤m2≤200; 1≤n2≤200, and 1≤p2≤200,

 (3)

wherein Z represents a C1-C18 linear or branched alkenyl group, or a substituent made by bonding, to the C1-C18 linear or branched alkenyl group, at least one linking group expressed by general formulae (3-1) to (3-4) below, the linking groups expressed by the general formulae (3-1) to (3-4) being bonded to a carbon atom in the above general formula (3) on a side indicated by reference sign "*" directly or via another linking group:

 (3-1)

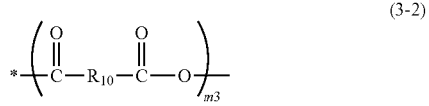 (3-2)

(3-3)

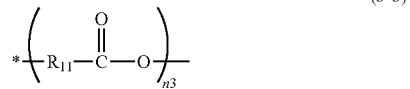 (3-4)

wherein $R_9$, $R_{10}$, $R_{11}$ and $R_{12}$ each represent either a C1-C18 divalent aliphatic hydrocarbon group that may be substituted with an ether bond-containing group or a C6-C30 divalent aromatic ring-containing hydrocarbon group that may be substituted with an ether bond-containing group, and l3, m3, n3 and p3 each represent an integer molar ratio to 1 mole of the above C1-C18 linear or branched alkenyl group, wherein, l3, m3, n3 and p3 meet the following expressions: l3+m3+n3+p3≤200; 1≤l3≤200; 1≤m3≤200, 1≤n3≤200, and 1≤p3≤200, and

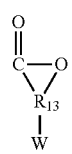
(4)

wherein $R_{13}$ represents a C1-C7 trivalent hydrocarbon group, and W represents a substituent expressed by a general formula (4-1) below, or a substituent made by bonding, to the substituent expressed by a general formula (4-1), at least one linking group expressed by general formulae (4-2) below, the linking groups expressed by the general formulae (4-2) being bonded to $R_{13}$ expressed in the general formula (4) on an oxygen atom side directly or via another linking group;

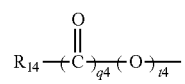
(4-1)

wherein $R_{14}$ represents a C1-C18 linear or branched alkenyl group, and q4 and t4 independently represent 0 or 1, and

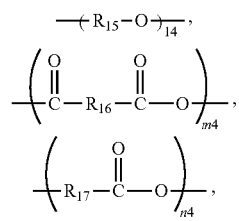
(4-2)

wherein $R_{15}$, $R_{16}$ and $R_{17}$ each represent either a C1-C18 divalent aliphatic hydrocarbon group that may be substituted with an ether bond-containing group or a C6-C30 divalent aromatic ring-containing hydrocarbon group that may be substituted with an ether bond-containing group, and l4, m4 and n4 each represent an integer molar ratio to 1 mole of the substituent expressed by the above general formula (4-1), wherein, l4, m4 and n4 meet the following expressions: l4+m4+n4≤200; 1≤l4≤200; 1≤m4≤200; and 1≤n4≤200.

3. The organic-inorganic composite particles according to claim 1, wherein
the inorganic particles are aluminum oxide particles, boron nitride particles or aluminum nitride particles respectively having an average particle diameter of 0.1 to 10 μm.

4. The organic-inorganic composite particles according to claim 1, wherein
the inorganic particles are contained in an amount of 10 to 80 wt % in the organic-inorganic composite particles.

5. The organic-inorganic composite particles according to claim 1, wherein
the polymerizable vinyl monomer includes: a monofunctional vinyl monomer having an ethylenic unsaturated group; and a polyfunctional vinyl monomer having two or more ethylenic unsaturated groups.

6. A method for manufacturing organic-inorganic composite particles, the organic-inorganic composite particles comprising: a vinyl polymer that is a polymer of a polymerizable vinyl monomer; and inorganic particles that include at least one of inorganic oxide and inorganic nitride and that have a thermal conductivity of 10 W/(m·K) or more, the method comprising the steps of:
preparing hydrophobized inorganic particles by reacting, in a hydrophilic solvent: the inorganic particles; acidic phosphoric acid ester having no polymerizable functional group; and at least one porimerizable compound selected from the group consisting of carboxylic acid having a polymerizable functional group, acidic phosphoric acid ester having a polymerizable functional group, and lactone having a polymerizable functional group;
preparing a polymerizable mixture by mixing the hydrophobized inorganic particles, the polymerizable vinyl monomer, and a polymerization initiator; and
obtaining the organic-inorganic composite particles by suspension polymerization in which the polymerizable mixture is polymerized in an aqueous medium in a presence of a dispersant.

7. The method for manufacturing organic-inorganic composite particles according to claim 6, wherein
a used amount of the hydrophobized inorganic particles is 10 to 80 wt % with respect to a total used amount of the polymerizable vinyl monomer and the inorganic particles.

8. A thermally conductive filler for a heat dissipation sheet or a thermal grease, the thermally conductive filler including the organic-inorganic composite particles according to claim 1.

9. A thermally conductive resin composition comprising the organic-inorganic composite particles according to claim 1 and a matrix resin.

10. A method for manufacturing a conductive resin composition comprising the steps of:
manufacturing organic-inorganic composite particles by the method according to claim 6; and
mixing the organic-inorganic composite particle with a matrix resin.

* * * * *